(12) United States Patent
Tanii et al.

(10) Patent No.: US 12,516,227 B2
(45) Date of Patent: Jan. 6, 2026

(54) ADHESIVE SHEET, ARTICLE, AND METHOD FOR MANUFACTURING ARTICLE

(71) Applicant: DIC Corporation, Tokyo (JP)

(72) Inventors: Shota Tanii, Saitama (JP); Akinori Morino, Chiba (JP); Sumio Shimooka, Saitama (JP)

(73) Assignee: DIC Corporation, Tokyo (JP)

( * ) Notice: Subject to any disclaimer, the term of this patent is extended or adjusted under 35 U.S.C. 154(b) by 102 days.

(21) Appl. No.: 18/327,244

(22) Filed: Jun. 1, 2023

(65) Prior Publication Data

US 2023/0312995 A1 Oct. 5, 2023

Related U.S. Application Data

(63) Continuation of application No. PCT/JP2021/045256, filed on Dec. 9, 2021.

(30) Foreign Application Priority Data

Dec. 15, 2020 (JP) .................................. 2020-207417

(51) Int. Cl.
*C09J 7/38* (2018.01)

(52) U.S. Cl.
CPC ......... *C09J 7/385* (2018.01); *C09J 2301/204* (2020.08); *C09J 2301/208* (2020.08); *C09J 2301/304* (2020.08); *C09J 2301/50* (2020.08)

(58) Field of Classification Search
CPC .. C09J 7/385; C09J 2301/304; C09J 2301/50; C09J 7/30; C09J 2203/354;

(Continued)

(56) References Cited

U.S. PATENT DOCUMENTS 10,596,792 B2 * 3/2020 Yamamoto ............ B32B 29/005
2013/0220510 A1 * 8/2013 Yamamoto ................. C09J 7/38
156/60

(Continued)

FOREIGN PATENT DOCUMENTS

JP H07-238276 A 9/1995
JP 2008-7704 A 1/2008

(Continued)

*Primary Examiner* — Scott R. Walshon
(74) *Attorney, Agent, or Firm* — Osha Bergman Watanabe & Burton LLP

(57) ABSTRACT

An adhesive sheet expandable by heating is provided. The adhesive sheet, before expansion, achieve temporary fixability at room temperature and ease of insertion when inserting one member into a cavity of another member. The adhesive sheet, after expansion, maintains excellent adhesive strength to enable the members to be firmly bonded together even under high temperature environments. An adhesive sheet includes a first principal face and a second principal face opposite to each other. The first principal face includes a thermally expandable thermosetting adhesive layer and a plurality of sticky parts provided on a first principal face of the thermally expandable thermosetting adhesive layer in a patterned manner. The second principal face includes the thermally expandable thermosetting adhesive layer forming the first principal face of the adhesive sheet or another thermally expandable thermosetting adhesive layer. An article including the adhesive sheet, and a method for producing the same are also provided.

16 Claims, 6 Drawing Sheets

(58) Field of Classification Search
CPC .......... C09J 2301/1242; C09J 2301/204; C09J 2301/208; C09J 2301/408; C09J 2301/412; C09J 2463/00; C09J 2479/086; C09J 5/06; C09J 7/10; C09J 133/00; C09J 201/00; B32B 27/00
See application file for complete search history.

(56) References Cited

U.S. PATENT DOCUMENTS

| | | | |
|---|---|---|---|
| 2019/0016927 A1* | 1/2019 | Lohmann | C09J 7/385 |
| 2019/0368534 A1* | 12/2019 | Shen | F16B 11/006 |
| 2020/0181458 A1* | 6/2020 | Lei | C09J 7/401 |
| 2020/0181459 A1* | 6/2020 | Lei | C09J 163/00 |

FOREIGN PATENT DOCUMENTS

| | | |
|---|---|---|
| JP | 2017-52950 A | 3/2017 |
| JP | 2019-182977 A | 10/2019 |

* cited by examiner

ADHESIVE SHEET, ARTICLE, AND METHOD FOR MANUFACTURING ARTICLE

TECHNICAL FIELD

One or more embodiments of the present invention relate to an adhesive sheet having an adhesive layer expandable by heating.

BACKGROUND

Methods of fixing in which one member is inserted into a cavity formed in another member or a cavity formed between two or more other members to be fixed are being used in production situations for various products such as automobiles and electric equipment. In motors installed in hybrid cars and the like, for example, a magnet is inserted into and fixed to a cavity provided in a certain position of a core part (a rotor core). A member to be inserted into a cavity is referred to as a member to be inserted, while a member formed with a cavity or a set of two or more members forming a cavity is referred to as an inserted member.

In the above method of fixing, to prevent the member inserted into the cavity from falling, the member to be inserted is usually inserted into the cavity of the inserted member, and then the cavity is filled with liquid adhesive to bond the member to be inserted and the inserted member together. However, this method may cause positional deviation of the member to be inserted in the cavity or cause the member to fall out of the cavity before the adhesive cures. In addition, the viscosity and the filling amount of the liquid adhesive are required to be adjusted, thus making the process complicated, and the process time may be prolonged. Furthermore, in the above method, the adhesive adheres outside the cavity of the member, causing contamination.

Given these circumstances, in recent years, methods of bonding the member to be inserted and the inserted member using an adhesive sheet instead of the liquid adhesive have been considered, and among them, being studied is a method of disposing an adhesive sheet having expandability in a cavity of the inserted member together with the member to be inserted and expanding the adhesive sheet to fill the cavity and to bond the member to be inserted and the inserted member together (PTL 1 and PTL 2, for example).

PATENT LITERATURE

PTL 1: Japanese Unexamined Patent Application No. 2017-052950

PTL 2: Japanese Unexamined Patent Application No. 2019-182977

The adhesive sheet for use in bonding between an adherend, which is the member to be inserted, and an adherend, which is the inserted member, is required to be inserted into the cavity between the members before the members are bonded together by heat expansion, and thus the adhesive sheet at room temperature before insertion is required to have low or no initial adhesiveness so as not to interfere with the insertability of the member. After insertion, on the other hand, the member to be inserted and the inserted member cannot be immediately bonded together, and thus the adhesive sheet is required to have high initial adhesiveness at room temperature so that the adhesive sheet does not deviate from a designated bonding position of the adherend before the adhesive sheet is expanded to be bonded and fixed. Furthermore, high heat resistance is required for bonding members becoming high temperatures, such as motors for automobiles, and thus the adhesive sheet is required to develop excellent adhesive strength to enable the member to be inserted and the inserted member to be firmly bonded together even under high temperature environments in addition to room temperature environments. However, it is difficult for conventional adhesive sheets for use in bonding between the member to be inserted and the inserted member to sufficiently achieve both room temperature temporary fixability, ease of insertion, and heat resistance.

SUMMARY

One or more embodiments of the present invention have been made in view of the above circumstances and provides an adhesive sheet expandable by heating, the adhesive sheet, before expansion, achieving both temporary fixability at room temperature and ease of insertion when inserting one member into a cavity of another member and, after expansion, maintaining excellent adhesive strength to enable the members to be firmly bonded together even under high temperature environments, an article including the adhesive sheet, and a method for producing the same.

First, one or more embodiments of the present invention provide an adhesive sheet including a first principal face and a second principal face opposite to each other, the first principal face of the adhesive sheet including a thermally expandable thermosetting adhesive layer and a plurality of sticky parts provided on a first principal face of the thermally expandable thermosetting adhesive layer in a patterned manner, and the second principal face of the adhesive sheet including the thermally expandable thermosetting adhesive layer forming the first principal face of the adhesive sheet or another thermally expandable thermosetting adhesive layer.

Second, one or more embodiments of the present invention provide an article including a first adherend and a second adherend, the second adherend being formed with a cavity, the first adherend being disposed in the cavity of the second adherend, and the first adherend and the second adherend being bonded together through an expanded product of the adhesive sheet described above in the cavity.

One or more embodiments of the present invention provide an article including a first adherend, a third adherend, and a fourth adherend, having a cavity between the third adherend and the fourth adherend, the first adherend being disposed in the cavity, and the first adherend and the third adherend and the first adherend and the fourth adherend being each bonded together through an expanded product of the adhesive sheet described above in the cavity.

Third, one or more embodiments of the present invention provide a method for producing an article, the method including a step [1A] of bonding the first principal face of the adhesive sheet described above to a surface of a first adherend or a surface of a cavity formed in a second adherend, a step [2A] of inserting the first adherend into the cavity, and a step [3A] of heating the adhesive sheet to expand and cure the thermally expandable thermosetting adhesive layer and to bond the first adherend and the second adherend together through an expanded product of the adhesive sheet.

One or more embodiments of the present invention provide a method for producing an article, the method including a step [1B] of bonding the first principal face of the adhesive sheet described above to a surface of a first adherend or a surface of a cavity formed by a third adherend and a fourth adherend, a step [2B] of inserting the first adherend into the cavity, and a step [3B] of heating the adhesive sheet to expand and cure the thermally expandable thermosetting adhesive layer and to bond the first adherend, and the third adherend and the fourth adherend together through an expanded product of the adhesive sheet.

The adhesive sheet of one or more embodiments of the present invention has heat expandability and can, before expansion, achieve both temporary fixability at room temperature and ease of insertion when inserting a member into a cavity and, after expansion, maintain excellent adhesive strength to enable members to be firmly bonded together even under high temperature environments.

DETAILED DESCRIPTION

I. Adhesive Sheet

Figure 1A:
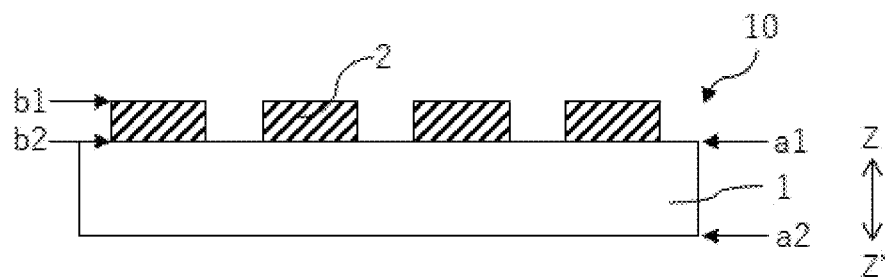
FIGS. 1A-1B are schematic sectional views of an example of an adhesive sheet of one or more embodiments of the present invention.

The adhesive sheet of one or more embodiments of the present invention is an adhesive sheet including a first principal face and a second principal face opposite to each other, the first principal face of the adhesive sheet including a thermally expandable thermosetting adhesive layer and a plurality of sticky parts provided on a first principal face of the thermally expandable thermosetting adhesive layer in a patterned manner, and the second principal face of the adhesive sheet including the thermally expandable thermosetting adhesive layer forming the first principal face of the adhesive sheet or another thermally expandable thermosetting adhesive layer.

In the expandable adhesive sheets disclosed in PTL 1 and PTL 2, for example, the thermosetting expandable adhesive layer has low or no initial adhesiveness, thus making it difficult to be easily temporarily fixed to an adherend under room temperature. Another method is to temporarily fix it to the adherend by heat laminating, but depending on the material of the adherend, it may be difficult to sufficiently temporarily fix it to the adherend by heat laminating, or the process may be complicated due to the need for equipment for heat laminating. Meanwhile, the thermoplastic pressure-sensitive adhesive layer has poor heat resistance, and thus under high temperature environments, the pressure-sensitive adhesive layer thermally deteriorates, and its adhesive strength decreases or disappears, making it difficult to firmly bond the member to be inserted and the inserted member together. The face on the opposite side of the pressure-sensitive adhesive layer from the face to be bonded to the member also has initial adhesiveness, and thus the member to be inserted may be caught during insertion into a cavity or may be bonded to a position other than a designated position, which may cause positional deviation. Thus, in conventional expandable adhesive sheets, it is difficult to achieve both temporary fixability and insertability at room temperature and heat resistance.

In contrast, the adhesive sheet of one or more embodiments of the present invention can achieve both good temporary fixability and insertability at room temperature, and furthermore, it has excellent heat resistance after expansion and can maintain excellent adhesive strength even under high temperature environments. In detail, in the adhesive sheet of one or more embodiments of the present invention, the first principal face of the sheet surface has a plurality of sticky parts provided in a patterned manner, and thus the adhesive sheet can be temporarily fixed to an adherend at room temperature by utilizing the high initial adhesiveness of the sticky parts, while the second principal face includes the thermally expandable thermosetting adhesive layer, and thus another adherend can be prevented from adhering to the second principal face of the adhesive sheet by utilizing the low initial adhesive strength of the thermally expandable thermosetting adhesive layer forming the second principal face, and the member to be inserted can be easily inserted into a cavity. The thermally expandable thermosetting adhesive layer expands by heating to fill the gap between the member to be inserted and the inserted member and cures by heating to develop high adhesive strength. In this process, in the first principal face of the adhesive sheet, the expansion of the thermally expandable thermosetting adhesive layer fills the gap between the sticky parts or buries the sticky parts, and thus the thermally expandable thermosetting adhesive layer after expansion comes into contact with one member and can be firmly bonded thereto. On the second principal face of the adhesive sheet, the expanded thermally expandable thermosetting adhesive layer comes into contact with the other member and can be firmly bonded thereto. Thus, the adhesive sheet of one or more embodiments of the present invention after expansion, in which the thermally expandable thermosetting adhesive layer after expansion and the members are bonded together on both faces of the sheet, can exhibit high adhesive strength to firmly bond the members together even under high temperature environments.

The first principal face of the adhesive sheet of one or more embodiments of the present invention includes a thermally expandable thermosetting adhesive layer and a plurality of sticky parts disposed on the surface of the thermally expandable thermosetting adhesive layer in a patterned manner. The first principal face of the adhesive sheet may be a protruding and recessed face including protruding sticky parts on the surface of the thermally expandable thermosetting adhesive layer or a flat surface in which the surface of the thermally expandable adhesive layer and the surface of the sticky parts are in the same plane.

In a preferred aspect of the adhesive sheet of one or more embodiments of the present invention, the sticky parts have a first face and an opposite second face, before expansion, in a thickness direction of the adhesive sheet, the first face of the sticky parts is positioned outside the first principal face of the thermally expandable thermosetting adhesive layer provided with the sticky parts, while the second face of the sticky parts is in contact with the first principal face of the thermally expandable thermosetting adhesive layer provided with the sticky parts or is positioned between the first principal face of the thermally expandable thermosetting adhesive layer and the opposite second principal face. In the adhesive sheet of such an aspect, after expansion, in the thickness direction of the adhesive sheet, the first face of the sticky parts is positioned at the same position as the first principal face of the thermally expandable thermosetting adhesive layer after expansion provided with the sticky parts or between the first principal face and the opposite second principal face, while the second face of the sticky parts is positioned between the first principal face of the thermally expandable thermosetting adhesive layer after expansion provided with the sticky parts and the opposite second principal face. In the following, the aspect described above may be referred to as a first aspect of the adhesive sheet.

Figure 1B:
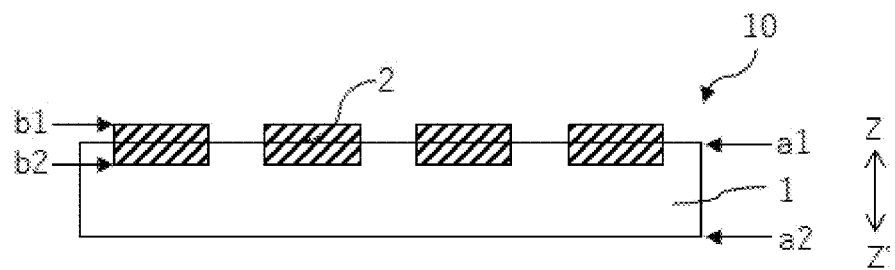
Figure 2A:
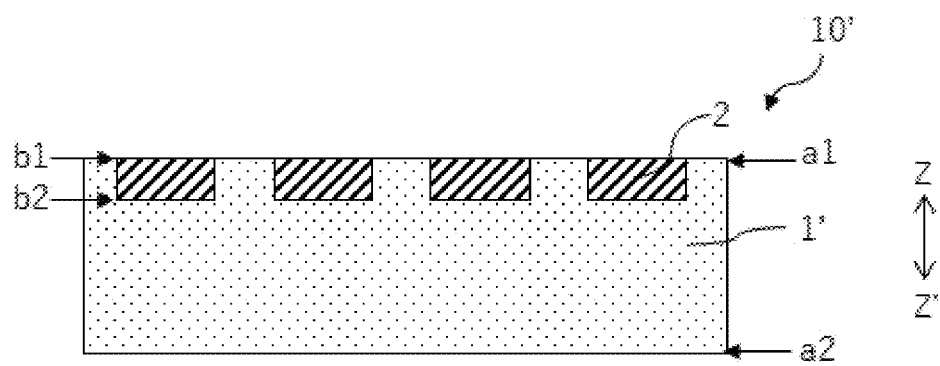
FIGS. 2A-2B are schematic sectional views of an example of the adhesive sheet of one or more embodiments of the present invention after expansion.
Figure 2B:
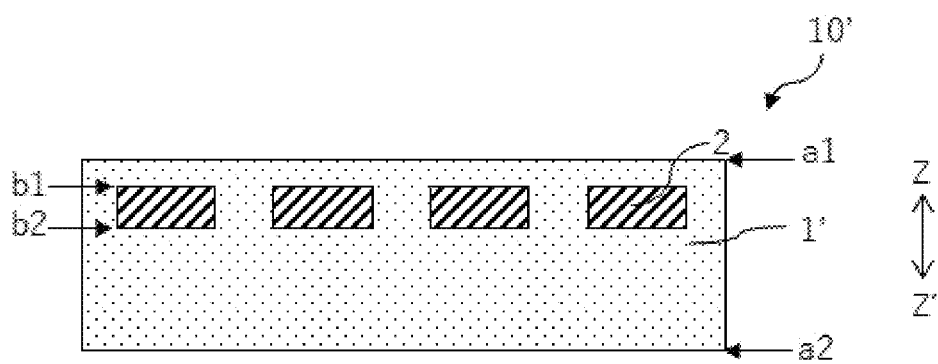

FIGS. 1A-1B and FIGS. 2A-2B are schematic sectional views of an example of the first aspect of the adhesive sheet of one or more embodiments of the present invention, in which FIGS. 1A-1B illustrate before expansion, whereas FIGS. 2A-2B illustrate after expansion. Of the surface of the adhesive sheet, the face on the Z side in a thickness direction Z-Z' is the first principal face of the adhesive sheet, while the face on the Z' side is the second principal face. In this adhesive sheet 10 before expansion, as illustrated in FIGS. 1A and 1B, in the thickness direction Z-Z' of the sheet, a first face b1 of sticky parts 2 is positioned outside a first principal face a1 of a thermally expandable thermosetting adhesive layer 1 provided with the sticky parts 2 (the opposite side of the first principal face a1 of the thermally expandable thermosetting adhesive layer 1 from the thermally expandable thermosetting adhesive layer). A second face b2 of the sticky parts 2 is in contact with the first principal face a1 of the thermally expandable thermosetting adhesive layer 1 provided with the sticky parts 2 as illustrated in FIG. 1A or is positioned between the first principal face a1 of the thermally expandable thermosetting adhesive layer 1 provided with the sticky parts 2 and a second principal face a2 as illustrated in FIG. 1B. As illustrated in FIGS. 2A-2B, in this adhesive sheet 10' after expansion, on the other hand, the area between the sticky parts 2, that is, the area on the first principal face of the adhesive sheet not provided with the sticky parts 2 (a non-sticky part area) is filled with a thermally expandable thermosetting adhesive layer 1' after expansion. Consequently, in the thickness direction Z-Z' of the sheet, the first face b1 of the sticky parts 2 is positioned at the same position as the first principal face a1 of the thermally expandable thermosetting adhesive layer 1' after expansion provided with the sticky parts 2 as illustrated in FIG. 2A or between the first principal face a1 and the opposite second principal face a2 as illustrated in FIG. 2B. The second face b2 of the sticky parts 2 is positioned between the first principal face a1 of the thermally expandable thermosetting adhesive layer 1' after expansion provided with the sticky parts 2 and the opposite second principal face a2.

As illustrated in FIGS. 1A-1B and FIGS. 2A-2B, in the first aspect of the adhesive sheet of one or more embodiments of the present invention, the sticky parts are disposed on the first principal face of the thermally expandable thermosetting adhesive layer, or part of the sticky parts is within the thermally expandable thermosetting adhesive layer, with the rest protruding from the first principal face of the thermally expandable thermosetting adhesive layer. That is, the first principal face of the adhesive sheet is a protruding and recessed face in which the sticky parts protrude, whereas the surface area of the thermally expandable thermosetting adhesive layer not provided with the sticky parts (the non-sticky part area) is recessed. With this structure, the adhesive sheet before expansion, in which the sticky parts come into contact with one of the member to be inserted and the inserted member on the first principal face, can exhibit temporary fixability. The second principal face of the adhesive sheet is a face including the thermally expandable thermosetting adhesive layer and does not have the sticky parts and can thus develop the insertability of the member to be inserted. After expansion, on the other hand, the expansion of the thermally expandable thermosetting adhesive layer fills the gap between the sticky parts on the first principal face of the adhesive sheet, burying the sticky parts in the thermally expandable thermosetting adhesive layer. The thermally expandable thermosetting adhesive layer expands and cures by heating to develop high adhesive strength. With this effect, the adhesive sheet after expansion, in which the thermally expandable thermosetting adhesive layer after expansion comes into contact with the member to be inserted and the inserted member on the first principal face and the second principal face, can firmly bond them together. In particular, the first aspect of the adhesive sheet of one or more embodiments of the present invention is preferred in that when the adhesive sheet of one or more embodiments of the present invention before expansion is temporarily fixed to an adherend, which is the member to be inserted, at room temperature, air bubbles entrained in an interface with the adherend can be quickly released, preventing the air bubbles from remaining in the interface and inhibiting faulty bonding of the adhesive sheet.

In a preferred aspect of the adhesive sheet of one or more embodiments of the present invention, the sticky parts have a first face and an opposite second face, before expansion, in a thickness direction of the adhesive sheet, the first face of the sticky parts is at the same position as the first principal face of the thermally expandable thermosetting adhesive layer provided with the sticky parts, while the second face of the sticky parts is positioned between the first principal face of the thermally expandable thermosetting adhesive layer provided with the sticky parts and the opposite second principal face. In the adhesive sheet of such an aspect, after expansion, in the thickness direction of the adhesive sheet, the first face of the sticky parts is positioned at the same position as the first principal face of the thermally expandable thermosetting adhesive layer after expansion provided with the sticky parts or between the first principal face and the opposite second principal face, while the second face of the sticky parts is positioned between the first principal face of the thermally expandable thermosetting adhesive layer after expansion provided with the sticky parts and the opposite second principal face. In the following, the aspect described above may be referred to as a second aspect of the adhesive sheet.

Figure 3:
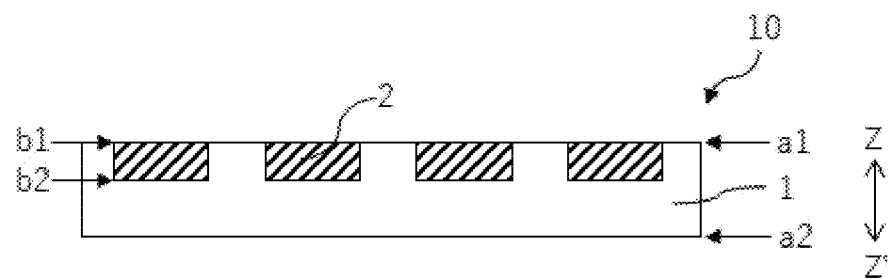
FIG. 3 is a schematic sectional view of an example of the adhesive sheet of one or more embodiments of the present invention.
Figure 4A:
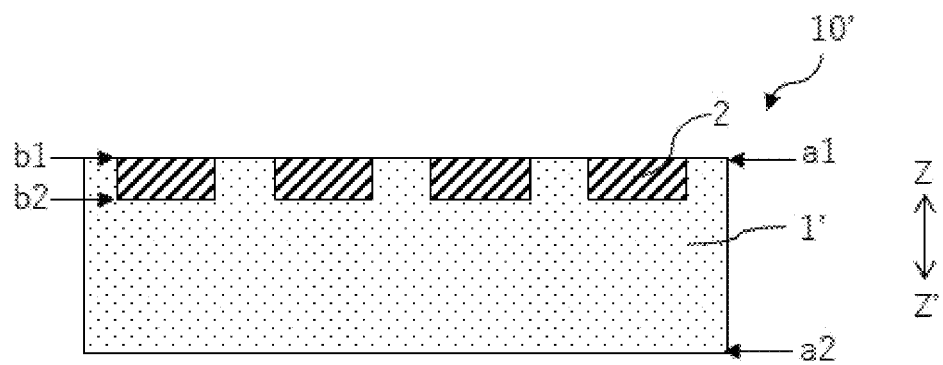
FIGS. 4A-4B are schematic sectional views of an example of the adhesive sheet of one or more embodiments of the present invention after expansion.
Figure 4B:
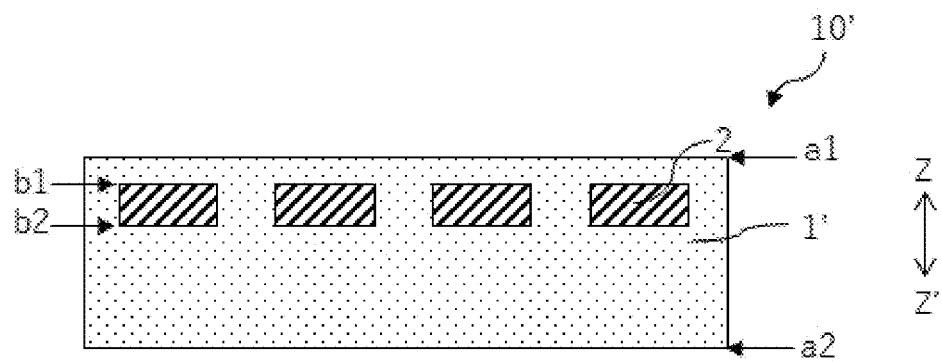

FIG. 3 and FIGS. 4A-4B are schematic sectional views of an example of the second aspect of the adhesive sheet of one or more embodiments of the present invention, in which FIG. 3 illustrates before expansion, whereas FIGS. 4A-4B illustrate after expansion. Of the surface of the adhesive sheet, the face on the Z side in a thickness direction Z-Z' is the first principal face of the adhesive sheet, while the face on the Z' side is the second face. As illustrated in FIG. 3, in the adhesive sheet 10 of one or more embodiments of the present invention, before expansion, in the thickness direction Z-Z' of the sheet, the first face b1 of the sticky parts 2 is at same position as the first principal face a1 of the thermally expandable thermosetting adhesive layer 1 provided with the sticky parts 2, while the second face b2 of the sticky parts 2 is positioned between the first principal face a1 of the thermally expandable thermosetting adhesive layer 1 provided with the sticky parts 2 and the opposite second principal face a2. As illustrated in FIGS. 4A-4B, in the adhesive sheet 10' after expansion, on the other hand, in the thickness direction Z-Z' of the sheet, the first face b1 of the sticky parts 2 is positioned at the same position as the first principal face a1 of the thermally expandable thermosetting adhesive layer 1' after expansion provided with the sticky parts 2 (FIG. 4A) or between the first principal face a1 and the opposite second principal face a2 (FIG. 4B), while the second face b2 of the sticky parts 2 is positioned between the first principal face a1 of the thermally expandable thermosetting adhesive layer 1' after expansion provided with the sticky parts 2 and the opposite second principal face a2.

As illustrated in FIG. 3 and FIGS. 4A-4B, in the second aspect of the adhesive sheet of one or more embodiments of the present invention, the sticky parts are buried in the thermally expandable thermosetting adhesive layer, and the first principal face of the adhesive sheet has the area of the first principal face of the thermally expandable thermosetting adhesive layer and the area of the first face of the sticky parts in the same plane. With this structure, the adhesive sheet before expansion, when bonded to one member on the first principal face, in which the sticky parts come into contact with the member, can exhibit temporary fixability. The second principal face of the adhesive sheet is a face including the thermally expandable thermosetting adhesive layer and does not have the sticky parts and can thus develop the insertability of the member to be inserted. In the adhesive sheet after expansion, on the other hand, the thermally expandable thermosetting adhesive layer expands and cures by heating to develop high adhesive strength, and thus in the adhesive sheet after expansion, the thermally expandable thermosetting adhesive layer after expansion comes into contact with the other member on the first principal face and the second principal face of the adhesive sheet and can be firmly bonded thereto. In particular, the second aspect of the adhesive sheet of one or more embodiments of the present invention is preferred in that before expansion, the first principal face of the thermally expandable thermosetting adhesive layer can be uniformly filled in the gap between the sticky parts in advance, and thus faulty filling of the thermally expandable thermosetting adhesive layer in the gap between the sticky parts after heating is less likely to occur, enabling more uniform bonding to the adherend, which is the member to be inserted.

The first face of the sticky parts being at the same position as the first principal face of the thermally expandable thermosetting adhesive layer provided with the sticky parts in the thickness direction of the adhesive sheet refers to the sticky parts being buried in the thermally expandable thermosetting adhesive layer and the first face of the sticky parts and the first principal face of the thermally expandable thermosetting adhesive layer being in the same plane. When the first face of the sticky parts and the first principal face of the thermally expandable thermosetting adhesive layer are at the same position, the first principal face of the adhesive sheet has an area of a plurality of sticky parts provided in a patterned manner (a sticky part area) and an area in which the surface of the thermally expandable thermosetting adhesive layer is exposed (the non-sticky part area). The second face of the sticky parts being positioned between the first principal face of the thermally expandable thermosetting adhesive layer provided with the sticky parts and the opposite second principal face in the thickness direction shall not include a case in which the second face of the sticky parts and the first principal face or the second principal face of the thermally expandable thermosetting adhesive layer are at the same position (in the same plane) in the thickness direction.

Figure 5:
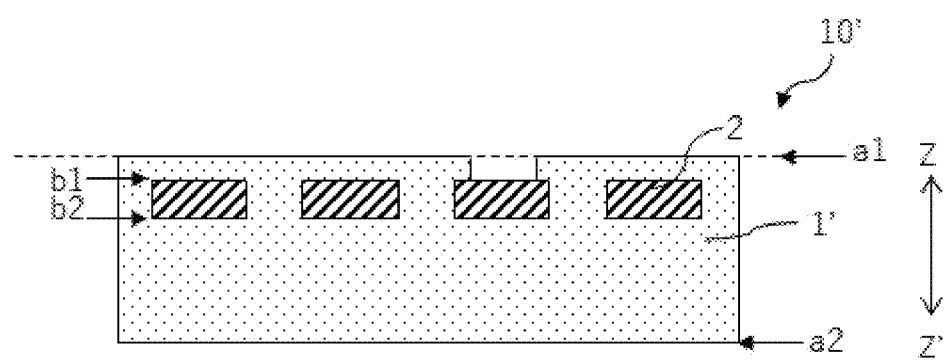
FIG. 5 is a schematic sectional view of an example of the adhesive sheet of one or more embodiments of the present invention after expansion.

Furthermore, the first face of the sticky parts being positioned between the first principal face and the second principal face of the thermally expandable thermosetting adhesive layer after expansion in the thickness direction of the adhesive sheet after expansion may cover all of the first face b1 of the sticky parts 2 with the thermally expandable thermosetting adhesive layer 1' after expansion as illustrated in FIG. 4B or expose part of the first face b1 of the sticky parts 2 out of the first principal face a1 of the thermally expandable thermosetting adhesive layer 1' after expansion as illustrated in FIG. 5.

In the adhesive sheet of one or more embodiments of the present invention, when at least the second face of the sticky parts is positioned between the first principal face and the second principal face of the thermally expandable thermosetting adhesive layer, that is, when part or all of the sticky parts is within the thermally expandable thermosetting adhesive layer, part or all of the sticky parts within the thermally expandable thermosetting adhesive layer may penetrate into the thermally expandable thermosetting adhesive layer or does not necessarily penetrate thereinto. The sticky parts penetrating into the thermally expandable thermosetting adhesive layer refers to, before expansion, an adhesive composition forming the thermally expandable thermosetting adhesive layer being mixed into the sticky parts and refers to, after expansion, at least a cured product of a thermosetting resin contained in the adhesive composition forming the thermally expandable thermosetting adhesive layer being mixed into the sticky parts.

The adhesive sheet after expansion is enough to ensure the intimate contact between the face of the thermally expandable thermosetting adhesive layer after expansion and the adherend bonded through the adhesive sheet on both the first principal face and the second principal face, and the form of the sticky parts in the adhesive sheet after expansion is not limited to a particular form. The shape of the sticky parts in the adhesive sheet after expansion may be the same or different from the shape of the sticky parts in the adhesive sheet before expansion. If the first face and/or the second face of the sticky parts cannot be identified in the adhesive sheet after expansion, the sticky parts are buried in the thermally expandable thermosetting adhesive layer after expansion, and thus the relation between the first face and the second face of the sticky parts and the first principal face and the second principal face of the thermally expandable thermosetting adhesive layer in the adhesive sheet after expansion described in the first aspect and the second aspect described above is assumed to be satisfied.

In the adhesive sheet of one or more embodiments of the present invention, the shear adhesive strength of the first principal face is usually larger than the shear adhesive strength of the second principal face so that it can exhibit temporary fixability by the first principal face and it can exhibit insertability by the second principal face. Specifically, the difference between the shear adhesive strength of the first principal face of the adhesive sheet and the shear adhesive strength of the second principal face is preferably 0.01 MPa or more, especially preferably 0.1 MPa or more, further preferably 0.4 MPa or more, and more preferably 0.5

MPa or more. This is because the difference in shear adhesive strength between the first principal face and the second principal face of the adhesive sheet being within the above range enables the first principal face and the second principal face to sufficiently exhibit the respective functions described above, and the function exhibited by one face can be prevented from impairing the function exhibited by the other face. A larger difference between the shear adhesive strength of the first principal face of the adhesive sheet and the shear adhesive strength of the second principal face is more preferred, which is not limited to a particular value and can be 2 MPa or less, for example, and may be 1 MPa or less.

The first principal face of the adhesive sheet of one or more embodiments of the present invention is enough to have a shear adhesive strength capable of exhibiting temporary fixability and usually has a higher shear adhesive strength than that of the second principal face. The shear adhesive strength of the first principal face of the adhesive sheet can be a magnitude capable of making the difference from the shear adhesive strength of the second principal face in the above range and is specifically preferably 0.2 MPa or more, especially preferably 0.3 MPa or more, further preferably 0.5 MPa or more, and in view of the capability of exhibiting higher temporary fixability on the first principal face of the adhesive sheet, more preferably 1.0 MPa or more. A higher shear adhesive strength of the first principal face of the adhesive sheet is more preferred, with the upper limit of the shear adhesive strength not limited to a particular value, and the upper limit can be 2 MPa, for example, and may be 1 MPa.

The shear adhesive strength of the first face of the adhesive sheet, which is mainly caused by the shear adhesive strength of the sticky parts and the thermally expandable thermosetting adhesive layer forming the first principal face, can be adjusted as appropriate in accordance with the layer configuration of the adhesive sheet and the like.

The second principal face of the adhesive sheet, on the other hand, is enough to have a shear adhesive strength capable of exhibiting insertability and usually has a lower shear adhesive strength than that of the first principal face. The shear adhesive strength of the second principal face of the adhesive sheet can be a magnitude capable of making the difference from the shear adhesive strength of the first principal face in the above range and is specifically preferably less than 0.5 MPa, especially preferably 0.3 MPa or less, further preferably 0.2 MPa or less, and in view of preventing the occurrence of troubles such as sticking of the second principal face of the adhesive sheet of one or more embodiments of the present invention to a position different from a designated position and the capability of increasing the insertability when inserting the member to be inserted into the cavity, more preferably 0.1 MPa or less. A lower shear adhesive strength of the second principal face is more preferred because the initial adhesiveness disappears and the insertability when inserting the member to be inserted into the cavity improves, and the lower limit value is preferably 0 MPa and may be 0.01 MPa or more.

The shear adhesive strength of the second principal face of the adhesive sheet, which is mainly caused by the shear adhesive strength of the thermally expandable thermosetting adhesive layer forming the second principal face, can be adjusted in accordance with the layer configuration of the adhesive sheet and the like.

The shear adhesive strength of each face of the adhesive sheet can be measured by the following method in conformity with the tensile shear test described in JIS Z 1541. First, the adhesive sheet is cut into a size of 10 mm×10 mm, and one face out of a first face and a second face of the cut adhesive sheet (a face not to be measured) is fixed to the surface of one aluminum plate A out of two degreased, smooth-surfaced aluminum plates (15 mm wide×70 mm long×0.5 mm thick) with strong adhesive, while the other face of the adhesive sheet (a face to be measured) is joined with the surface of the other aluminum plate B, thereby holding the adhesive sheet between the two aluminum plates A and B, which are pressure bonded together at 23° C. for 10 seconds with a load of 0.5 MPa, which is a test piece. Next, the test piece is left under a 23° C. environment for 5 minutes, and then the ends of the two aluminum plates A and B are each chucked, and a tensile test is performed at 10 mm/minute in a 180° direction using a Tensilon tensile testing machine. The value obtained in this case can be defined as the shear adhesive strength of the face of the adhesive sheet on the aluminum B side (the face to be measured).

The face not to be measured of the adhesive sheet is strongly fixed to the aluminum plate A using the strong adhesive, thus not causing peeling on the face not to be measured side of the adhesive sheet in the tensile test, and measurement is possible as the shear adhesive strength of the face to be measured.

The first face and the second face of the adhesive sheet refer to one outermost face and the other outermost face of the adhesive sheet excluding a release liner. Unless otherwise specified, when described as "the adhesive sheet" and "the thermally expandable thermosetting adhesive layer," they mean "the adhesive sheet" and "the thermally expandable thermosetting adhesive layer" before expansion, respectively. Furthermore, "an expanded product of the adhesive sheet" and "an expanded product of the thermally expandable thermosetting adhesive layer" mean "the adhesive sheet after expansion" and "the thermally expandable thermosetting adhesive layer after expansion," respectively. "After expansion" refers to after expansion and curing of the thermally expandable thermosetting adhesive layer and refers to "after heating at 150° C. for 60 minutes" unless otherwise specified.

1. Thermally Expandable Thermosetting Adhesive Layer

The thermally expandable thermosetting adhesive layer of one or more embodiments of the present invention is a layer expanding and curing by heating.

The adhesive sheet of one or more embodiments of the present invention may have one thermally expandable thermosetting adhesive layer or have two or more thermally expandable thermosetting adhesive layers. The two or more thermally expandable thermosetting adhesive layers may be laminated on each other directly or laminated on each other through an intermediate layer described below. When the adhesive sheet of one or more embodiments of the present invention has one thermally expandable thermosetting adhesive layer, the second principal face of the adhesive sheet includes the thermally expandable thermosetting adhesive layer forming the first principal face of the adhesive sheet. That is, a plurality of sticky parts are provided on the first principal face of the thermally expandable thermosetting adhesive layer, which is a single layer, in a patterned manner, while the second principal face thereof is the second principal face of the adhesive sheet.

When the adhesive sheet has two or more thermally expandable thermosetting adhesive layers, on the other hand, the second principal face of the adhesive sheet includes a thermally expandable thermosetting adhesive layer different from the thermally expandable thermosetting adhesive layer forming the first principal face of the adhesive sheet. That is, out of the two or more thermally expandable thermosetting adhesive layers, the sticky parts are provided on the thermally expandable thermosetting adhesive layer at one outermost position in the thickness direction of the adhesive sheet to form the first principal face of the adhesive sheet, while the thermally expandable thermosetting adhesive layer at the other outermost position forms the second principal face of the adhesive sheet.

When the adhesive sheet of one or more embodiments of the present invention has two or more thermally expandable thermosetting adhesive layers, the thermally expandable thermosetting adhesive layers may have the same composition and thickness or have different ones.

At least the thermally expandable thermosetting adhesive layer forming the second principal face of the adhesive sheet of one or more embodiments of the present invention usually has a lower shear adhesive strength than that of the sticky parts and especially more preferably has low or no initial adhesiveness (stickiness) in order to prevent the occurrence of troubles such as sticking of the second principal face of the adhesive sheet to a position different from a designated position and to increase insertability.

The shear adhesive strength of the thermally expandable thermosetting adhesive layer forming the second principal face of the adhesive sheet of one or more embodiments of the present invention is preferably less than 0.5 MPa, especially preferably 0.3 MPa or less, further preferably 0.2 MPa or less, and more preferably 0.1 MPa or less. Setting the above shear strength can prevent the occurrence of troubles such as sticking to a position different from a designated position when inserting the adhesive sheet of one or more embodiments of the present invention into the cavity of the inserted member and increase insertability. A lower shear adhesive strength of the thermally expandable thermosetting adhesive layer is more preferred because the initial adhesiveness disappears and the insertability when inserting the member to be inserted into the cavity improves, and the lower limit value is preferably 0 MPa and may be 0.05 MPa or more.

When the adhesive sheet of one or more embodiments of the present invention has two or more thermally expandable thermosetting adhesive layers, it is enough that the thermally expandable thermosetting adhesive layer forming the second principal face of the adhesive sheet has the shear adhesive strength described above, and the other thermally expandable thermosetting adhesive layers may have a shear adhesive strength within the above range or of higher than the above range. When the shear adhesive strength of the thermally expandable thermosetting adhesive layer provided with the sticky parts is higher than the shear adhesive strength of the thermally expandable thermosetting adhesive layer forming the second principal face, the temporary fixability of the adhesive sheet on the first principal face can be enhanced. The preferred range of the shear adhesive strength of the thermally expandable thermosetting adhesive layer provided with the sticky parts in the above case can be the same as the preferred range of the shear adhesive strength of the sticky parts described below.

The shear adhesive strength of the thermally expandable thermosetting adhesive layer can be adjusted as appropriate by blending additives such as resin components, inorganic fillers, and slip agents contained in a thermosetting adhesive composition described below, for example.

The shear adhesive strength of the thermally expandable thermosetting adhesive layer can be measured by the following method in conformity with the tensile shear test described in JIS Z 1541. First, a sheet shape is formed using a sticky agent with the same composition as that of the thermally expandable thermosetting adhesive layer so as to give the same thickness as that of the thermally expandable thermosetting adhesive layer of the adhesive sheet, and the formed product is cut into a size of 10 mm×10 mm and is held between two degreased, smooth-surfaced aluminum plates (15 mm wide×70 mm long×0.5 mm thick), which are pressure bonded together at 23° C. for 10 seconds with a load of 0.5 MPa, which is a test piece. The test piece is left under a 23° C. environment for 5 minutes, and then the ends of the two aluminum plates are each chucked, and a tensile test is performed at 10 mm/minute in a 180° direction using a Tensilon tensile testing machine, and the value obtained in this case can be used as the shear adhesive strength.

The thickness of the thermally expandable thermosetting adhesive layer is preferably 1 µm or more, more preferably in a range of 10 µm to 400 µm, further preferably in a range of 15 µm to 250 µm, and particularly preferably in a range of 20 µm to 200 µm in view of obtaining even better adhesive strength. When two or more thermally expandable thermosetting adhesive layers are included, the thickness shall be a thickness per layer.

The thickness of the thermally expandable thermosetting adhesive layer is preferably 10% or more and more preferably 30% or more with respect to the total thickness of the adhesive sheet. Setting the above range makes it easier to fix the other adherend (the member to be inserted) to a cavity of one adherend (the inserted member) or to fill the cavity with the adhesive sheet, for example. When two or more thermally expandable thermosetting adhesive layers are included, the total thickness of the thicknesses of the thermally expandable thermosetting adhesive layers with respect to the total thickness of the adhesive sheet is preferably within the above range.

The thermally expandable thermosetting adhesive layer is a layer expanding by heating and has a thickness direction expansion rate of the thermally expandable thermosetting adhesive layer after heating at 150° C. for 60 minutes of preferably 150% or more, especially further preferably 175% or more, and more preferably 200% or more. The expansion rate is preferably 1,000% or less, further preferably 800% or less, and more preferably 500% or less. With the adhesive sheet in which the thermally expandable thermosetting adhesive layer shows such an expansion rate, even if the height (thickness) of the cavity of the inserted member is large, the adhesive sheet is expanded, and the other adherend can be suitably fixed in the cavity, or the cavity can be filled with the adhesive sheet. Even if the surface of the adherend is rough or uneven, sufficiently intimate contact is made possible, and the other adherend can be suitably fixed. If the expansion rate is too high, the density of the layer decreases and degradation is likely to occur due to exposure to high temperatures, but the expansion rate is within the above range, and thereby thermal degradation is unlikely to occur, and high adhesive strength can be maintained even under high temperature environments. When two or more thermally expandable thermosetting adhesive layers are included, the expansion rate shall be an expansion rate per layer.

The thickness direction expansion rate (%) of the thermally expandable thermosetting adhesive layer after heating at 150° C. for 60 minutes is a value calculated based on the following method and equation. First, the thickness of the thermally expandable thermosetting adhesive layer in the adhesive sheet before heating (before expansion) is measured under a 23° C. environment. Next, after leaving the adhesive sheet at rest and heating it under a 150° C.

environment for 60 minutes, the adhesive sheet is taken out to a 23° C. environment, and immediately, the thickness of the thermally expandable thermosetting adhesive layer in the adhesive sheet after heating (after expansion) is measured. Based on the above measurement result and the following equation, the expansion rate is calculated.

Thickness direction expansion rate (%) of thermally expandable thermosetting adhesive layer after heating=[thickness of thermally expandable thermosetting adhesive layer after heating/thickness of thermally expandable thermosetting adhesive layer before heating]×100(%)

Instead of the adhesive sheet, the same thermally expandable thermosetting adhesive layer as the thermally expandable thermosetting adhesive layer in the adhesive sheet in composition and thickness formed on a release liner may be used as a test sample, and the expansion rate may be calculated based on the thicknesses before and after heating the test sample at 150° C. for 60 minutes and the above equation.

The thickness of the thermally expandable thermosetting adhesive layer after expansion, that is, an expanded adhesive layer formed by the thermally expandable thermosetting adhesive layer having expanded and cured by heating is preferably in a range of 20 µm to 2,500 µm and more preferably in a range of 40 µm to 1,500 µm in view of obtaining even better adhesive strength. The thermally expandable thermosetting adhesive layer after expansion preferably has a porous structure.

The glass transition temperature of the thermally expandable thermosetting adhesive layer after expansion is preferably 80° C. or higher. This is because the expanded adhesive layer can exhibit excellent adhesive strength even when exposed to high temperature environments and can firmly maintain the bonding between the member to be inserted and the inserted member especially used for uses that are prone to reach high temperatures. More specifically, the glass transition temperature of the thermally expandable thermosetting adhesive layer after expansion is preferably 80° C. or higher, especially preferably 100° C. or higher, further preferably 120° C. or higher, and more preferably 150° C. or lower. The upper limit of the glass transition temperature of the thermally expandable thermosetting adhesive layer after expansion is not limited to a particularly temperature, but it is set to 300° C. or lower to enable the member to be inserted and the inserted member to be bonded together without damaging them, for example. When the adhesive sheet of one or more embodiments of the present invention has two or more thermally expandable thermosetting adhesive layers, at least the thermally expandable thermosetting adhesive layers forming the first principal face and the second principal face of the adhesive sheet preferably have a glass transition temperature within the above range after expansion (after curing), and all the thermally expandable thermosetting adhesive layers preferably have the glass transition temperature after expansion (after curing).

The glass transition temperature of the thermally expandable thermosetting adhesive layer after expansion refers to a peak temperature determined in a spectrum of loss tangent (tan δ) calculated, after measuring the storage modulus (E') and the loss modulus (E") at a frequency of 1 Hz using a dynamic viscoelasticity measuring apparatus (manufactured by Rheometrics, product name: RSA-II) with a test piece chucked with a gripper, which is a measuring part of the tester, from a value (E"/E') obtained by dividing the loss modulus (E") by the storage modulus (E'). The test piece used for the above measurement can be measured using a piece of the thermally expandable thermosetting adhesive layer after expansion punched out in the shape of the test piece type 5 of JIS K 7127 using a dumbbell cutter after heating the thermally expandable thermosetting adhesive layer at 150° C. for 60 minutes.

The thermally expandable thermosetting adhesive layer after expansion preferably makes its curing rate 80% or more. Setting the above curing rate can exhibit excellent adhesive strength even when exposed to high temperature environments and can firmly maintain the bonding between the member to be inserted and the inserted member especially used for uses that are prone to reach high temperatures. The thermally expandable thermosetting adhesive layer after expansion (after heating) more preferably makes the curing rate 90% or more and further preferably makes the curing rate 99% or more.

The curing rate of the thermally expandable thermosetting adhesive layer after expansion is expressed in terms of gel fraction and refers to a value calculated based on, after immersing the thermally expandable thermosetting adhesive layer after expansion obtained by heating the thermally expandable thermosetting adhesive layer at 150° C. for 60 minutes in a toluene solution adjusted to 23° C. for 24 hours, the mass of the thermally expandable thermosetting adhesive layer remaining in the solvent after drying and the following equation.

Gel fraction (% by mass)={(mass of thermally expandable thermosetting adhesive layer remaining without being dissolved in toluene)/(mass of thermally expandable thermosetting adhesive layer before immersion in toluene)}×100

The thermally expandable thermosetting adhesive layer is a layer containing at least a thermosetting resin and an expansion agent. In other words, the thermally expandable thermosetting adhesive layer is a layer formed by a thermally expandable thermosetting adhesive composition containing at least a thermosetting resin and an expansion agent.

The thermally expandable thermosetting adhesive layer can be formed by applying an adhesive composition containing a thermosetting resin and an expansion agent to a release liner or the like and drying it, for example.

The thermally expandable thermosetting adhesive layer after expansion is an expanded adhesive layer the volume of which has been increased by the expansion agent contained in the thermally expandable thermosetting adhesive composition expanding by heating and is formed by a cured product of the thermally expandable thermosetting adhesive composition.

The term "in (the entire resin component of) the thermally expandable thermosetting adhesive layer" can be defined namely as "in (the entire resin component of) the thermally expanding thermosetting adhesive composition forming the thermally expanding thermosetting adhesive layer." The resin component is defined as a resin component forming the adhesive composition excluding the expansion agent.

(Thermosetting Resin)

The thermally expandable thermosetting adhesive layer contains at least a thermosetting resin as the resin component. As the thermosetting resin, one or two or more thermosetting resins selected from urethane resins, phenolic resins, unsaturated polyester resins, epoxy resins, acrylic resins, and the like can be used, for example. Among them, as the thermosetting resin, epoxy resins and/or phenolic resins are preferably used in view of imparting good adhesiveness to an adherend during heat curing, and further, epoxy resins are more preferably used in view of ensuring good heat curability and having high heat resistance.

As the epoxy resins, compounds having one or more epoxy groups per molecule can be used. Specific examples thereof include bisphenol type epoxy resins such as bisphenol A type epoxy resins and bisphenol F type epoxy resins and modified resins thereof, dicyclopentadiene type epoxy resins such as dicyclopentadiene-phenol addition reaction type epoxy resins, biphenyl type epoxy resins, tetramethylbiphenyl type epoxy resins, polyhydroxynaphthalene type epoxy resins, isocyanate-modified epoxy resins, 10-(2,5-dihydroxyphenyl)-9,10-dihydro-9-oxa-10-phospha-phenanthrene-10-oxide-modified epoxy resins, phenol novolac type epoxy resins, cresol novolac type epoxy resins, triphenylmethane type epoxy resins, tetraphenylethane type epoxy resins, dicyclopentadiene-phenol addition reaction type epoxy resins, phenol aralkyl type epoxy resins, naphthol novolac type epoxy resins, hexanediol type epoxy resins, naphthol aralkyl type epoxy resins, naphthol-phenol co-condensed novolac type epoxy resins, naphthol-cresol co-condensed novolac type epoxy resins, aromatic hydrocarbon formaldehyde resin-modified phenolic resin type epoxy resins, biphenyl-modified novolac type epoxy resins, trimethylol propane type epoxy resins, alicyclic epoxy resins, acrylic resins having epoxy groups, polyurethane resins having epoxy groups, polyester resins having epoxy groups, and epoxy resins having flexibility.

One epoxy resin may be used alone or two or more epoxy resins may be used in combination. The epoxy resin may be solid, semi-solid, or liquid. In particular, as the epoxy resin, it is preferable to use multifunctional epoxy resins having two or more epoxy groups per molecule and/or mixtures thereof. Using the epoxy resins can raise the glass transition temperature of the thermally expandable thermosetting adhesive layer after expansion and inhibit a reduction in adhesive strength under high temperatures. As the epoxy resins, epoxy resins other than multifunctional epoxy resins may be used in combination. Using the epoxy resins in combination can easily adjust the flexibility, softening point, melt viscosity, glass transition temperature, and the like of the thermally expandable thermosetting adhesive layer.

As the thermosetting resin contained in the thermally expandable thermosetting adhesive layer, it is preferable to use one having a total epoxy equivalent weight of in a range of 2,000 g/eq. or less. This is preferred because the glass transition temperature of the thermally expandable thermosetting adhesive layer after expansion can be raised, and a reduction in adhesive strength under high temperatures can be inhibited. The total epoxy equivalent weight is preferably 50 g/eq. or more and 1,500 g/eq. or less, 100 g/eq. or more and 1,000 g/eq. or less, and 150 g/eq. or more and 500 g/eq. or less.

As the thermosetting resin, an epoxy resin with an epoxy equivalent weight of 500 g/eq. or less is preferably contained in a range of 30% by mass to 70% by mass in the entire resin component of the thermally expandable thermosetting adhesive layer because it can raise the glass transition temperature of the thermally expandable thermosetting adhesive layer after heat curing and inhibit a reduction in adhesive strength under high temperatures. The epoxy equivalent weight is preferably 50 g/eq. or more and 450 g/eq. or less, 100 g/eq. or more and 400 g/eq. or less, and 150 g/eq. or more and 300 g/eq or less. The content of the epoxy resin having an epoxy equivalent weight in the above range is preferably in a range of 35% by mass or more and 65% by mass or less, in a range of 40% by mass or more and 60% by mass or less, and in a range of 45% by mass or more and 55% by mass or less in the entire resin component of the thermally expandable thermosetting adhesive layer. The content of the epoxy resin having an epoxy equivalent weight in the above range, when two or more epoxy resins having an epoxy equivalent weight in the above range are contained, shall be the total amount of them.

The "epoxy equivalent weight" is defined by the molecular weight of epoxy resin per epoxy group and can be determined by the method described in JIS K7236, How to determine the epoxy equivalent weight of epoxy resin (2001) (the perchloric acid-tetraethylammonium bromide method) or the like.

The thermally expandable thermosetting adhesive layer preferably contains one or two or more solid thermosetting resins (hereinafter, referred to as a solid resin) as the thermosetting resin. The "solid resin" refers to resins with a high softening point or resins that are semi-solid or solid at 25° C. The softening point of the solid resin is preferably 5° C. or higher. As the thermosetting resin, especially a solid resin with a softening point of 30° C. or higher and 150° C. or lower is preferably contained, and a solid resin with a softening point of 50° C. or higher and 100° C. or lower is more preferably contained.

The content of the solid resin in the thermally expandable thermosetting adhesive layer can be set as appropriate in accordance with the shear adhesive strength and the like required for the thermally expandable thermosetting adhesive layer. In at least the thermally expandable thermosetting adhesive layer forming the second principal face of the adhesive sheet of one or more embodiments of the present invention, the content of the solid resin is preferably 30% by mass or more and more preferably 50% by mass or more, 60% by mass or more, 70% by mass or more, 80% by mass or more, 85% by mass or more, and 90% by mass or more in the entire resin component of the thermally expandable thermosetting adhesive layer. The content is preferably 99% by mass or less and more preferably 97% by mass and 95% by mass in the entire resin component of the thermally expandable thermosetting adhesive layer forming the second principal face of the adhesive sheet. More specifically, the content of the solid resin is preferably 30% by mass or more, especially preferably 50% by mass or more and 99% by mass or less, and further preferably 70% by mass or more and 95% by mass or less. This is because by containing the solid resin in the above range, the initial adhesiveness (stickiness) of the thermally expandable thermosetting adhesive layer can be reduced, and when inserting the member to be inserted into the cavity of the inserted member, the occurrence of troubles such as deviation of the bonding position of the adhesive sheet and its sticking to a position different from a designated position can be prevented, and the insertability can be improved. When two or more solid resins are contained, the content of the solid resin shall be the total amount of the two or more solid resins.

Specific examples of the solid resin include phenol novolac type epoxy resins, cresol novolac type epoxy resins, triphenylmethane type epoxy resins, tetraphenylethane type epoxy resins, dicyclopentadiene-phenol addition reaction type epoxy resins, phenol aralkyl type epoxy resins, naphthol novolac type epoxy resins, naphthol aralkyl type epoxy resins, naphthol-phenol co-condensed novolac type epoxy resins, and naphthol-cresol co-condensed novolac type epoxy resins. One of these resins may be used alone or two or more resins may be used.

The thermally expandable thermosetting adhesive layer may contain a thermosetting resin that is liquid at room temperature (hereinafter, may be referred to as a liquid resin)

in combination as needed. This is because it is possible to adjust the shear adhesive strength and the like of the thermally expandable thermosetting adhesive layer to a desired magnitude. The liquid resin has a viscosity at 25° C. of preferably 3,000,000 mPa·sec or less, and especially the above viscosity is more preferably 1,000 mPa·sec or more and 2,000,000 mPa·sec or less and further preferably 10,000 mPa·sec or more and 1,500,000 mPa·sec or less.

The content of the liquid resin in the thermally expandable thermosetting adhesive layer can be set as appropriate in accordance with the shear adhesive strength and the like required for the thermally expandable thermosetting adhesive layer. In at least the thermally expandable thermosetting adhesive layer forming the second principal face of the adhesive sheet of one or more embodiments of the present invention, the content of the liquid resin is preferably 40% by mass or less, especially preferably 30% by mass or less, further preferably 20% by mass or less, and more preferably 10% by mass or less in the entire resin component of the thermally expandable thermosetting adhesive layer. The content of the liquid resin may be 0% by mass, or more than 0% by mass, or may be contained in 1% by mass or more, contained in 3% by mass or more, and contained in 5% by mass or more. More specifically, the content can be 40% by mass or less, 1% by mass or more and 30% by mass or less, 3% by mass or more and 20% by mass or less, and 5% by mass or more and 10% by mass or less. By setting the content of the liquid resin in the thermally expandable thermosetting adhesive layer forming the second principal face to the above range, the initial adhesiveness (stickiness) can be reduced, and when inserting the member to be inserted into the cavity of the inserted member, the occurrence of troubles such as deviation of the bonding position of the adhesive sheet and its sticking to a position different from a designated position can be prevented, and the insertability can be improved. In addition, the flexibility of the thermally expandable thermosetting adhesive layer before expansion and its fluidity during heating can be made suitable, and the handleability of the adhesive sheet of one or more embodiments of the present invention and the expansion rate of the adhesive sheet during heating can be made suitable. When two or more liquid resins are contained, the content of the liquid resin shall be the total amount of the two or more liquid resins.

When the thermally expandable thermosetting adhesive layer forming the second principal face of the adhesive sheet of one or more embodiments of the present invention contains the liquid resin, the liquid resin can be used with the viscosity range and the content range described above combined with each other as appropriate. The liquid resin can be used with the viscosity range and the content range described above combined with each other as appropriate. An example of preferred aspects of the thermally expandable thermosetting adhesive layer forming the second principal face of the adhesive sheet of one or more embodiments of the present invention preferably contains a liquid resin with a viscosity of 3,000,000 mPa·sec or less in 20% by mass or less, preferably contains a liquid resin with a viscosity in a range of 1,000 mPa·sec to 2,000,000 mPa·sec in a range of 1% by mass to 15% by mass, and preferably contains a liquid resin with a viscosity in a range of 10,000 mPa·sec to 1,500,000 mPa·sec in a range of 3% by mass to 10% by mass. This is because the shear adhesive strength of the second principal face of the adhesive sheet can be made sufficiently lower than that of the first principal face, and the insertability improves.

For the thermally expandable thermosetting adhesive layer other than the thermally expandable thermosetting adhesive layer forming the second principal face of the adhesive sheet, the content of the liquid resin is not limited to a particular content and can be adjusted as appropriate in accordance with a required shear adhesive strength.

Specific examples of the liquid resin include bisphenol type epoxy resins such as bisphenol A type epoxy resins and bisphenol F type epoxy resins and modified resins thereof, trimethylolpropane type epoxy resins, and alicyclic epoxy resins. One liquid resin may be used alone or two or more liquid resins may be used.

When the thermally expandable thermosetting adhesive layer forming the second principal face of the adhesive sheet of one or more embodiments of the present invention contains the solid resin and the liquid resin described above, the blending ratio between the solid resin and the liquid resin (the solid resin: the liquid resin) is enough to be a ratio capable of making the shear adhesive strength of the thermally expandable thermosetting adhesive layer in a desired range and is preferably in a range of 99.9:0.1 to 60:40, preferably in a range of 99:1 to 70:30, and preferably in a range of 95:5 to 80:20 in terms of mass ratio, for example. This is because the blending ratio between the solid resin and the liquid resin being set to the above range can make the shear adhesive strength of the second principal face of the adhesive sheet sufficiently lower than that of the first principal face.

The thermosetting resin is preferably contained in 10% by mass or more and 99% by mass or less, is especially preferably contained in 20% by mass or more and 90% by mass or less, is more preferably contained in 30% by mass or more and 80% by mass or less, and is further preferably contained in 40% by mass or more and 70% by mass or less in the entire resin component of the thermally expandable thermosetting adhesive layer. By setting the content of the thermosetting resin in the thermally expandable thermosetting adhesive layer to be within the above range, the flexibility of the thermally expandable thermosetting adhesive layer before expansion and its fluidity during heating can be made suitable, and the handleability of the adhesive sheet of one or more embodiments of the present invention and the expansion rate of the adhesive sheet during heating can be made suitable.

(Curing Agent)

The thermally expandable thermosetting adhesive layer and the thermally expandable thermosetting adhesive composition forming it preferably contain a curing agent that can react with the thermosetting resin. This is because when heating the thermally expandable thermosetting adhesive layer, the thermosetting resin can sufficiently cure to develop high adhesive strength. The curing agent is preferably contained before the thermally expandable thermosetting adhesive layer is thermally cured or before forming the thermally expandable thermosetting adhesive layer in sheet form.

For the curing agent, a compound corresponding to the type of the thermosetting resin, especially the type of a functional group of the thermosetting resin can be selected and used as appropriate. When an epoxy resin is used as the thermosetting resin, for example, as the curing agent, it is preferable to use one having a functional group that can react with its epoxy group. Examples of the curing agent include amine-based compounds, amide-based compounds, acid anhydride-based compounds, and phenolic compounds. As the curing agent, a powdery one is preferably used.

Examples of the amine-based compounds include diaminodiphenylmethane, diethylenetriamine, triethylenetetramine, diaminodiphenylsulfone, isophoronediamine, imidazole derivatives, BF3-amine complexes, and guanidine derivatives.

Examples of the amide-based compounds include dicyandiamide and polyamide resins synthesized from a dimer of linolenic acid and ethylenediamine.

Examples of the acid anhydride-based compounds include phthalic anhydride, trimellitic anhydride, pyromellitic anhydride, maleic anhydride, tetrahydro phthalic anhydride, methyl tetrahydro phthalic anhydride, methyl nadic anhydride, hexahydro phthalic anhydride, and methyl hexahydro phthalic anhydride.

Examples of the phenolic compounds include phenol novolac resins, cresol novolac resins, aromatic hydrocarbon formaldehyde resin-modified phenolic resins, dicyclopentadiene-phenol addition type resins, phenol-aralkyl resins (xylok resins), naphthol-aralkyl resins, trimethylolmethane resins, tetraphenylolethane resins, naphthol novolac resins, naphthol-phenol co-condensed novolac resins, naphthol-cresol co-condensed novolac resins, biphenyl-modified phenolic resins (polyvalent phenolic compounds with phenolic nuclei linked by bismethylene groups), biphenyl-modified naphthol resins (polyvalent naphthol compounds with phenolic nuclei linked by bismethylene groups), aminotriazine-modified phenolic resins (compounds having a phenolic skeleton, a triazine ring, and a primary amino group in the molecular structure), and polyvalent phenolic compounds such as alkoxy group-containing aromatic ring-modified novolac resins (polyvalent phenolic compounds with a phenolic nucleus and an alkoxy group-containing aromatic ring linked by formaldehyde).

When an epoxy resin is used as the thermosetting resin, for example, the curing agent has a ratio of the equivalent weight of the functional group that can react with the epoxy group contained in the curing agent to the total epoxy equivalent weight of the thermosetting resin of preferably in a range of 0.3 or more and 2.0 or less, more preferably in a range of 0.5 or more and 1.5 or less, and further preferably in a range of 0.7 or more and 1.0 or less. Using within the above range can sufficiently cure the thermosetting resin to improve the heat resistance of the adhesive sheet.

The curing temperature of the thermosetting resin is preferably the expansion temperature of the expansion agent described below or higher, while the curing time is preferably an expansion time or more. This setting can allow the expansion agent to sufficiently expand in the thermosetting resin having softened by heating and make sheet thickness after expansion uniform.

(Curing Accelerator)

The thermally expandable thermosetting adhesive layer and the thermally expandable thermosetting adhesive composition forming it may contain a curing accelerator. The curing accelerator is preferably contained before the thermally expandable thermosetting adhesive layer is thermally cured or before forming the thermosetting adhesive layer in sheet form.

As the curing accelerator, phosphorus-based compounds, amine compounds, imidazole derivatives, or the like can be used. When using the curing accelerator, the amount of use is preferably 0.1 part by mass to 10 parts by mass and more preferably in a range of 0.5 part by mass to 5 parts by mass with respect to 100 parts by mass of the entire resin component contained in the thermally expandable thermosetting adhesive layer.

As the curing accelerator, a powdery one is preferably used. The powdery curing accelerator inhibits a thermosetting reaction under low temperatures compared to a liquid curing accelerator, and thus the storage stability of the thermosetting resin before heat curing under room temperature can be further improved.

(Thermoplastic Resin)

The thermally expandable thermosetting adhesive layer and the thermally expandable thermosetting adhesive composition forming it can be used containing a thermoplastic resin to the extent that the fixability of a bonded part is not impaired even when used under an environment with large temperature changes after expansion and curing.

Examples of the thermoplastic resin include thermoplastic resins such as thermoplastic polyurethane (TPU); phenoxy resins such as polyhydroxy polyethers synthesized from bisphenols and epichlorohydrin; polycarbonate (PC); vinyl chloride-based resins such as polyvinyl chloride (PVC) and vinyl chloride-vinyl acetate copolymerized resins; acrylic resins such as polyacrylic acid, polymethacrylic acid, poly(methyl acrylate), poly(methyl methacrylate) (PMMA), and poly(ethyl methacrylate); polyester-based resins such as polyethylene terephthalate (PET), polybutylene terephthalate, polytrimethylene terephthalate, polyethylene naphthalate, and polybutylene naphthalate; polyamide-based resins such as nylon (registered trademark); polystyrene-based resins such as polystyrene (PS), imide-modified polystyrene, acrylonitrile-butadiene-styrene (ABS) resins, imide-modified ABS resins, styrene-acrylonitrile copolymerized (SAN) resins, and acrylonitrile-(ethylene-propylene-diene)-styrene (AES) resins; olefinic resins such as polyethylene (PE) resins, polypropylene (PP) resins, and cycloolefin resins; cellulose-based resins such as nitrocellulose and cellulose acetate; silicone resins; and fluorine-based resins and thermoplastic elastomers such as styrenic thermoplastic elastomers, olefinic thermoplastic elastomers, vinyl chloride-based thermoplastic elastomers, urethane-based thermoplastic elastomers, ester-based thermoplastic elastomers, and amide-based thermoplastic elastomers.

Among them, the thermally expandable thermosetting adhesive layer preferably contains one or two or more thermoplastic resins having a reactive group reacting with the thermosetting resin (hereinafter, may be referred to as a "reactive thermoplastic resin"). This is because the reactive group of the reactive thermoplastic resin reacts with the thermosetting resin, thereby enabling the thermally expandable thermosetting adhesive layer after curing to develop higher adhesive strength. Examples of the reactive group reacting with the thermosetting resin include an epoxy group, a hydroxy group, a carboxy group, an amino group, and an isocyanate group. Examples of the thermoplastic resin having such a reactive group include thermoplastic polyurethane (TPU), polyhydroxy polyether (phenoxy resins), and acrylic resins.

For the above reason, the thermoplastic resin can be used in a range of 1 part by mass to 200 parts by mass with respect to 100 parts by mass of the thermosetting resin. The thermoplastic resin is especially preferably used in a range of 10 parts by mass to 150 parts by mass and, in view of the capability of developing high adhesive strength, is more preferably used in a range of 30 parts by mass to 100 parts by mass with respect to 100 parts by mass of the thermosetting resin.

(Expansion Agent)

As the expansion agent contained in the thermally expandable thermosetting adhesive layer and the thermally expandable thermosetting adhesive composition forming it, it is preferable to use one that enables the thermally expandable thermosetting adhesive layer after expansion to form a porous structure in the layer. Examples of such an expansion agent include inorganic compounds such as ammonium carbonate, ammonium bicarbonate, ammonium nitrite, ammonium borohydride, and azides, alkane fluorides such as trichloromonofluoromethane, azo compounds such as azobisisobutyronitrile, hydrazine compounds such as para-toluenesulfonylhydrazide, semicarbazide compounds such as p-toluenesulfonylsemicarbazide, triazole compounds such as 5-morpholyl-1,2,3,4-thiatriazole, and N-nitroso compounds such as N,N'-dinitrosoterephthalamide.

As the expansion agent, expandable capsules or the like in which hydrocarbon-based solvent is microencapsulated can be used, for example. As the expansion agent, one expansion agent may be used alone or two or more expansion agents may be used in combination.

As the expansion agent, among those described above, it is more preferable to use the expandable capsules in which hydrocarbon-based solvent is microencapsulated in view of preventing deterioration or the like of the thermally expandable thermosetting adhesive layer by the influence of heat, for example.

As the expansion agent, it is preferable to use one that can expand at temperatures around the softening point of the thermally expandable thermosetting adhesive layer because it can sufficiently expand the adhesive sheet.

Examples of commercially available products of the expandable capsules include Expancel (manufactured by Japan Fillite Co., Ltd.), Matsumoto Microsphere (manufactured by Matsumoto Yushi-Seiyaku Co., Ltd.), and Microsphere (manufactured by Kureha Corporation). As the expandable capsules, it is preferable to use ones having a volume after expansion with respect to the volume of the capsules before expansion (a volumetric expansion ratio) of 8 times to 60 times.

The amount of use of the expansion agent, preferably the amount of use of the thermally expandable capsules, is preferably in a range of 0.3 part by mass to 30 parts by mass, more preferably in a range of 0.5 part by mass to 25 parts by mass, and further preferably in a range of 1 part by mass to 20 parts by mass with respect to 100 parts by mass of the entire resin component of the thermally expandable thermosetting adhesive layer. The amount of use of the expansion agent being set to be within the above range can sufficiently fill the cavity of the inserted member, obtain even better adhesive strength, and maintain high adhesive strength to the member to be inserted or the inserted member, which is an adherend, to firmly bond the member to be inserted and the inserted member together.

(Optional Components)

The thermally expandable thermosetting adhesive layer and the thermally expandable thermosetting adhesive composition forming it can be used containing additives such as fillers, softeners, stabilizers, adhesion promoters, leveling agents, defoamers, plasticizers, stickiness imparting resins, fibers, antioxidants, UV absorbers, hydrolysis inhibitors, thickening agents, coloring agents such as pigments, and fillers to the extent that the effects of one or more embodiments of the present invention are not impaired in addition to the components describes above.

2. Sticky Parts

The sticky parts of one or more embodiments of the present invention are provided on the first principal face of the thermally expandable thermosetting adhesive layer forming the first principal face of the adhesive sheet in a patterned manner and form the first principal face of the adhesive sheet.

The first principal face of the adhesive sheet has the sticky parts, can thereby exhibit a desired shear adhesive strength due to the initial adhesive strength of at least the sticky parts, and can temporarily fix the adhesive sheet so as not to deviate from a designated position after inserting the member to be inserted into the cavity of the inserted member, until the adhesive sheet is expanded to bond and fix the member to be inserted and the inserted member together.

In order for the first principal face of the adhesive sheet of one or more embodiments of the present invention to have a higher shear adhesive strength than that of the second principal face to enable development of the function of temporary fixability, the sticky parts have a shear adhesive strength of preferably 0.2 MPa or more, especially preferably of 0.3 MPa or more, further preferably 0.5 MPa or more, and more preferably 1.0 MPa or more. Setting the above range can obtain an adhesive sheet having higher temporary fixability. A higher shear adhesive strength of the sticky parts is more preferred, with the upper limit thereof not limited to a particular value, which can be 2 MPa or less, for example, and may be 1 MPa. The shear adhesive strength of the sticky parts can be adjusted by adjustment of sticky agent components described below, the pattern and shape of the sticky parts, size per one, and the total area proportion of the sticky parts with respect to the first principal face of the adhesive sheet. The shear adhesive strength of the sticky parts means, in other words, the shear adhesive strength of a sticky agent layer including the sticky parts and the non-sticky part area not provided with the sticky parts.

The shear adhesive strength of the sticky parts can be measured in conformity with the tensile shear test described in JIS Z 1541, and a value can be used obtained by forming a plurality of sticky parts on a release liner in a patterned manner in the same manner as in the sticky parts of the adhesive sheet, transferring the sticky parts to one adherend of two smooth adherends (aluminum plates), then overlaying the other adherend and the sticky parts on each other to be in contact with each other, pressure bonding them together at 23° C. for 10 seconds with a load of 0.5 MPa and leaving them at rest at 23° C. for 30 minutes to make a test piece, each chucking the ends of the two aluminum plates of the test piece, and performing a tensile test at 10 mm/minute in a 180° direction using a tensile testing machine.

The peak temperature of loss tangent (tan $\delta$) based on a dynamic viscoelasticity spectrum measured at a frequency of 1 Hz of the sticky parts, which is not limited to a particular value, is preferably −30° C. to 20° C., more preferably −20° C. to 10° C., and in view of the capability of maintaining good adhesive strength, preferably −10° C. to 5° C.

The loss tangent based on the dynamic viscoelasticity spectrum is calculated, after measuring the storage modulus (G') and the loss modulus (G") at a frequency of 1 Hz using a viscoelasticity testing machine (manufactured by manufactured by Rheometrics, product name: ARES 2KSTD) with a test piece held between parallel discs, which are a measuring part of the testing machine, by the equation represented by tan $\delta=(G")/(G')$. The peak temperature refers to a peak temperature identified in the spectrum of tan $\delta$ for a measurement temperature range (−50° C. to 150° C.). As the test piece, a sticky agent layer with a thickness of 0.5 mm to 2.5 mm formed using the sticky agent used for the formation of the sticky parts can be used.

The sticky parts of one or more embodiments of the present invention are provided on the first principal face of the thermally expandable thermosetting adhesive layer in a patterned manner and have the non-sticky part area, in which the component forming the sticky parts is not present, between adjacent sticky parts.

The sticky parts are basically independent of each other, but there may be points in which two or more sticky parts are partially connected to each other. Examples of the pattern of the sticky parts include a dot-like (what is called island-like) one, a strip-like (band-like) one, and a grid-like one.

The planar view shape of the sticky parts (the shape observed from the plane of the adhesive sheet) is preferably a substantially circular shape, a substantially quadrilateral shape, or a substantially hexagonal shape. The substantially circular shape, which is not limited to a particular circular shape, preferably has a ratio between the maximum diameter and the minimum diameter of any one sticky part [maximum diameter/minimum diameter] of 1 to 4. The [maximum diameter/minimum diameter] is further preferably 1 to 2 and most preferably 1 to 1.5.

Examples of the substantially quadrilateral shape include shapes such as a substantially square shape, a substantially rectangular shape, a substantially trapezoidal shape, and a substantially rhombic shape. The "substantially" in each shape indicates that the shape includes a shape in which a corner part of a quadrilateral shape or a hexagonal shape is rounded and a shape in which a linear part has become a curved part due to the sticky parts being pressed or the like, for example. The corner part of the substantially quadrilateral shape is preferably a substantially rhombic shape with an angle of the corner part directed to the flow direction of the adhesive sheet of less than 90°, and the angle is more preferably in a range of 45° to 70° because good adhesive strength for developing temporary fixability can be maintained.

When the sticky parts are dot-like (what is called island-like), the size (the area in a planar view) of the sticky parts per one is preferably in a range of 0.02 mm$^2$ to 0.50 mm$^2$, more preferably in a range of 0.03 mm$^2$ to 0.30 mm$^2$, and particularly preferably in a range of 0.05 mm$^2$ to 0.20 mm$^2$. The size of the sticky parts per one being set to the above range can, before the expansion of the adhesive sheet, maintain good temporary fixability and, after expansion, bond the thermally expandable thermosetting adhesive layer after the expansion and the adherend together more firmly on the first principal face of the adhesive sheet without interfering with the filling of the gap between the sticky parts or the burying of the sticky parts by the expansion of the thermally expandable thermosetting adhesive layer.

When the pattern of the sticky parts is a grid-like one or a stripe-like one, the planar view shape of the sticky parts can be a linear one, for example, and the above linear one can be a straightly linear one or a wavy linear one (a serpentine one or a zigzag one). When the pattern of the sticky parts is a grid-like one or a stripe-like one, the width of the sticky parts is not limited to a particular width so long as the above effects are produced and can be set as appropriate in accordance with the total area proportion of the sticky parts with respect to the first principal face of the adhesive sheet described below.

The shapes and the sizes per one of the sticky parts may be different from each other or the same, but the shapes and the sizes per one are preferably substantially the same.

The shortest distance between any first sticky part selected from the sticky parts and a second sticky part close to (present closest to) the first sticky part is preferably in a range of 0.05 mm to 0.60 mm, further preferably in a range of 0.10 mm to 0.40 mm, and more preferably in a range of 0.15 mm to 0.30 mm. The shortest distance between the two sticky parts close to each other being set to the above range can, before the expansion of the adhesive sheet, maintain good temporary fixability and, after expansion, bond the thermally expandable thermosetting adhesive layer after the expansion and the adherend together more firmly on the first principal face of the sheet without interfering with the filling of the gap between the sticky parts or the burying of the sticky parts by the expansion of the thermally expandable thermosetting adhesive layer.

The distance between the first sticky part and the second sticky part close to the first sticky part refers to the shortest distance among distances between the first sticky part and the second sticky part close to the first sticky part. When the pattern of the sticky parts is a grid-like one or a stripe-like one, the shortest distance between any first sticky part and a second sticky part close to (present closest to) the first sticky part refers to the distance between the first sticky part and the second sticky part extending in the same direction as the direction in which the first sticky part extends and being close to the first sticky part.

In a planar view, the total area proportion of the sticky parts with respect to the first principal face of the adhesive sheet of one or more embodiments of the present invention before expansion is preferably 20% or more and 80% or less, further preferably 30% or more and 70% or less, and more preferably 40% or more and 60% or less. The area proportion of the sticky parts with respect to the first principal face of the adhesive sheet being set to be within the above range can, before expansion, maintain good temporary fixability by the first principal face of the adhesive sheet and, after expansion, bond the thermally expandable thermosetting adhesive layer after expansion and the adherend together more firmly on the first principal face of the sheet without interfering with the filling of the gap between the sticky parts or the burying of the sticky parts by the expansion of the thermally expandable thermosetting adhesive layer. The total area proportion of the sticky parts is also referred to as an area share of the sticky parts with respect to the area of the first principal face of the adhesive sheet.

The total area proportion of the sticky parts with respect to the first principal face of the adhesive sheet of one or more embodiments of the present invention before expansion in a planar view is a value calculated by the following equation.

Total area proportion of sticky parts with respect to first principal face of adhesive sheet before expansion=[total area of sticky parts in a planar view of adhesive sheet before expansion]/[area of the entire first principal face of adhesive sheet before expansion]×100(%)

The shape and size of the sticky parts, the shortest distance between any first sticky part selected from the sticky parts and a second sticky part close to (present closest to) the first sticky part, and the like can be determined through plane observation with an electron microscope, for example.

The thickness of the sticky parts is preferably 1 μm or more and 50 μm or less, preferably 2 μm or more and 30 μm or less, and more preferably 3 μm or more and 10 μm or less. Setting the thickness to the above range is preferred because even if the surface of the adherend is rough or uneven, for example, the adhesive sheet follows the surface of the adherend to obtain good temporary fixability, and even after the adhesive sheet of one or more embodiments of the present invention is heated to expand the thermally expandable thermosetting adhesive layer and to fill the cavity to be fixed, excellent adhesive strength can be obtained.

The sticky parts may have thermal expandability, or does not necessarily have thermal expandability, and can be set as appropriate in accordance with the composition of the sticky agent forming the sticky parts. In particular, it is preferable for the sticky parts not to have thermal expandability from the viewpoint that the thermally expandable thermosetting adhesive layer after expansion can be bonded to the adherend more firmly on the first principal face of the adhesive sheet without interfering with the filling of the gap between the sticky parts or the burying of the sticky parts by the expansion of the thermally expandable thermosetting adhesive layer after the expansion of the adhesive sheet.

The sticky parts after heating at 150° C. for 60 minutes has a thickness direction expansion rate of preferably 120% or less, preferably 115% or less, and the expansion rate is most preferably 100% (the sticky parts do not substantially expand).

The thickness direction expansion rate (%) of the sticky parts refers to, when the adhesive sheet of one or more embodiments of the present invention is heated under a 150° C. environment for 60 minutes, the rate of the thickness of the sticky parts after the heating to the thickness of the sticky parts before the heating. Specifically, it refers to a value calculated by the following method. First, the thickness of the sticky parts in the adhesive sheet before heating (before expansion) is measured under a 23° C. environment. Next, after leaving the adhesive sheet at rest and heating it under a 150° C. environment for 60 minutes, the adhesive sheet is taken out to a 23° C. environment, and immediately, the thickness of the sticky parts in the adhesive sheet after heating (after expansion) is measured. Based on the above measurement result and the following equation, the expansion rate is calculated.

Thickness direction expansion rate (%) of sticky parts=[thickness of sticky parts after heating/thickness of sticky parts before heating]×100

The sticky parts have a gel fraction of preferably 60% by mass or less, further preferably 10% by mass to 55% by mass, and more preferably 20% by mass to 50% by mass. This is because the gel fraction of the sticky parts being set to be within the above range makes it easier to maintain the surface shape of the sticky parts, thus makes it easier to prevent shape changes over time, and can have sufficient initial adhesiveness to exhibit temporary fixability on the first principal face of the adhesive sheet.

The gel fraction of the sticky parts can be calculated from the rate of insoluble matter when patterned sticky parts formed on a release liner in the same manner as in the adhesive sheet of one or more embodiments of the present invention are immersed in toluene for 24 hours and is calculated by the following equation.

Gel fraction (% by mass)={(mass of sticky parts after immersion in toluene)/(mass of sticky parts before immersion in toluene)}×100

As the sticky agent composition forming the sticky parts, it is preferable to use one having excellent initial adhesiveness (stickiness) at room temperature (23° C.) and capable of developing excellent adhesive strength even after the adhesive sheet of one or more embodiments of the present invention is heat expanded. Examples of such a sticky agent composition include compositions containing at least an adhesive resin.

As the adhesive resin contained in the sticky agent composition, acrylic resins, rubber-based resins, polyurethane-based resins, polyester-based resins, silicone-based resins, and the like can be used, for example. The sticky agent composition especially preferably contains an acrylic resin as a main component. The main component refers to a component most abundantly contained in the sticky agent composition.

For the acrylic resin, one obtained by polymerizing a monomer including alkyl (meth)acrylates can be used, for example. Examples of the monomer include methyl (meth) acrylate, ethyl (meth)acrylate, n-butyl (meth)acrylate, isobutyl (meth)acrylate, t-butyl (meth)acrylate, n-octyl (meth)acrylate, iso-octyl(meth)acrylate, isononyl(meth) acrylate, cyclohexyl (meth)acrylate, and 2-ethylhexyl (meth)acrylate, one of which can be used or two or more of which can be used in combination. In particular, as alkyl (meth)acrylates, the use of alkyl (meth)acrylates with an alkyl group carbon number of 4 to 12 is more preferred in view of obtaining an adhesive sheet having excellent followability and intimate adhesiveness to an adherend having surface unevenness and also having excellent bonding workability.

As the monomer, apart from the above, acrylonitrile, (meth)acrylic acid, maleic anhydride, acrylamide, itaconic acid, styrene, vinyl acetate, and the like can be used.

Examples of the rubber-based resins include styrenic AB type diblock copolymers such as styrene-ethylene-butylene copolymers (SEB); styrenic ABA type triblock copolymers such as styrene-butadiene-styrene copolymers (SBS), hydrogenated SBS (styrene-ethylene-butylene-styrene copolymers (SEBS)), styrene-isoprene-styrene copolymers (SIS), hydrogenated SIS (styrene-ethylene-propylene-styrene copolymers (SEPS)), and styrene-isobutylene-styrene copolymers (SIBS); styrenic ABAB type tetrablock copolymers such as styrene-butadiene-styrene-butadiene (SBSB); styrenic ABABA type pentablock copolymers such as styrene-butadiene-styrene-butadiene-styrene (SBSBS); styrenic multiblock copolymers having these or more AB repeating units; and hydrogenated products obtained by hydrogenating the ethylenic double bond of styrenic random copolymers such as styrene-butadiene rubber (SBR). For styrenic thermoplastic elastomers, commercially available products may be used.

In addition to the resins described above, the sticky agent composition can contain stickiness imparting resins, cross-linking agents, other additives, and the like as needed.

As the stickiness imparting resins, for the purpose of adjusting the strong adhesiveness of the sticky parts, rosin-based stickiness imparting resins, polymerized rosin-based stickiness imparting resins, polymerized rosin ester-based stickiness imparting resins, rosin phenolic stickiness imparting resins, stabilized rosin ester-based stickiness imparting resins, disproportionated rosin ester-based stickiness imparting resins, terpene-based stickiness imparting resins, terpene phenolic stickiness imparting resins, petroleum resin-based stickiness imparting resins, and the like can be used, for example.

As the cross-linking agents, for the purpose of improving the cohesion of the sticky parts, known isocyanate-based cross-linking agents, epoxy-based cross-linking agents, aziridine-based cross-linking agents, polyvalent metal salt-based cross-linking agents, metal chelate-based cross-linking agents, keto-hydrazide-based cross-linking agents, oxazoline-based cross-linking agents, carbodiimide-based cross-linking agents, silane-based cross-linking agents, glycidyl(alkoxy)epoxysilane-based cross-linkers, and the like can be used.

As the additives, known materials such as bases (such as ammonia water) and acids for adjusting pH, foaming agents, plasticizers, softeners, antioxidants, fillers in the form of glass or plastic fibers, balloons, beads, or metal powder, coloring agents such as pigments and dyes, pH adjusters, film-forming aids, leveling agents, thickening agents, water repellents, defoamers, and expansion agents can be used as needed to the extent that desired effects of one or more embodiments of the present invention are not impaired.

Examples of the form of the sticky agent composition include a solvent-based one, a water-based one such as emulsion type sticky agents and water-soluble sticky agents, and a solventless one such as hot-melt type sticky agents, UV-curable sticky agents, and EB-curable sticky agents.

For the sticky agent composition, one containing a solvent can be used in view of maintaining good application workability and the like. As the solvent, toluene, xylene, ethyl acetate, butyl acetate, acetone, methyl ethyl ketone, hexane, and the like can be used, for example. When a water-based adhesive composition is used, water or water-based aqueous solvents can be used as the solvent. The "entire amount of the sticky agent composition" when specifying the content of each component shall not include the amount of the solvent.

3. Optional Configurations

Figure 6:
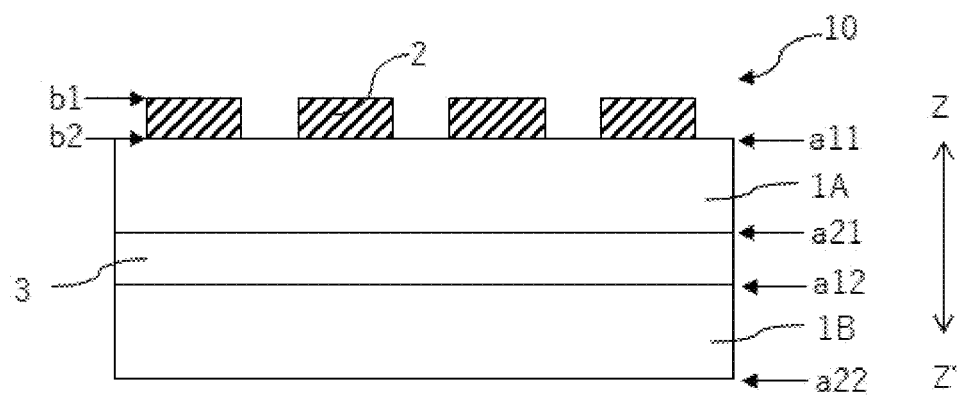
FIG. 6 is a schematic sectional view of an example of the adhesive sheet of one or more embodiments of the present invention.

The adhesive sheet of one or more embodiments of the present invention has at least the sticky parts and the thermally expandable thermosetting adhesive layer and may have optional configurations as needed. As illustrated in FIG. 6, for example, the adhesive sheet of one or more embodiments of the present invention may have a first thermally expandable thermosetting adhesive layer 1A having a first principal face a11 and a second principal face a21, a second thermally expandable thermosetting adhesive layer 1B having a first principal face a21 and a second principal face a22, and an intermediate layer 3 disposed between the first thermally expandable thermosetting adhesive layer 1A and the second thermally expandable thermosetting adhesive layer 1B and bonded to the second principal face a21 of the first thermally expandable thermosetting adhesive layer 1A and the first principal face a12 of the second thermally expandable thermosetting adhesive layer 1B and have a plurality of sticky parts 2 provided on the first principal face a11 of the first thermally expandable thermosetting adhesive layer 1A in a patterned manner. The adhesive sheet illustrated in FIG. 6, or the adhesive sheet of one or more embodiments of the present invention, in which the first principal face includes the sticky parts 2 and the first thermally expandable thermosetting adhesive layer 1A, while the second principal face includes the second thermally expandable thermosetting adhesive layer 1B, has the intermediate layer 3 and can thereby have good rigidity and have better bonding workability.

The intermediate layer is preferably a base having heat resistance. The level of heat resistance of the base, which varies by uses, is, in terms of the melting point of the base, preferably 150° C. or higher, more preferably 200° C. or higher, and further preferably 250° C. or higher.

The melting point refers to a temperature indicating a maximum endothermic peak observed when the temperature of the intermediate layer (base) is raised on a temperature rising condition with a temperature rising rate of 10° C./minute from 30° C. using a differential scanning calorimeter (DSC).

Specific examples of the base having heat resistance include polybutylene terephthalate, polyethylene naphthalate (PEN), polyamide, polyimide, polyetherimide, polysulfone, polyetherketone (PEEK), polyphenylene sulfide (PPS), and modified polyphenylene oxide.

The intermediate layer preferably has a thickness of 1 μm or more and 200 μm or less, more preferably has a thickness of 5 μm or more and 150 μm or less, and further preferably has a thickness of 10 μm or more and 100 μm or less. This is because by setting the thickness of the intermediate layer to the above range, when bonding the face of the adhesive sheet of one or more embodiments of the present invention on the side having the sticky parts to an adherend, the face sufficiently follows the surface shape of the adherend even if the surface of the adherend is rough or uneven, and excellent adhesiveness is obtained. The intermediate layer may include a single layer of the base having heat resistance or two or more layers including the same or different bases having heat resistance laminated on each other.

The adhesive sheet of one or more embodiments of the present invention may be provided with a release liner on the first principal face having the sticky parts and the second principal face on the opposite side from the side having the sticky part each. For the release liner, known ones such as resin films can be used.

4. Others

The adhesive sheet of one or more embodiments of the present invention has a total thickness before expansion (before heating) of preferably 10 μm or more and 600 μm or less, especially preferably 50 μm or more and 500 μm or less, and further preferably 100 μm or more and 400 μm or less. The total thickness after expansion (after heating) is preferably 20 μm or more and 2,500 μm or less, especially preferably 40 μm or more and 2,000 μm or less, and further preferably 100 μm or more and 1,000 μm or less. The total thickness of the adhesive sheet shall not include the thickness of the release liner.

The adhesive sheet of one or more embodiments of the present invention has a shear adhesive strength after expansion under a room temperature (23° C.) environment of preferably 3 MPa or more, especially preferably 5 MPa or more, further preferably 6 MPa or more, and more preferably 9 MPa or more. This is because it has excellent adhesion retention performance to the member to be inserted and the inserted member. The shear adhesive strength after expansion under a 150° C. environment is preferably 1 MPa or more, further preferably 4 MPa or more, and more preferably 7 MPa or more. This is because the adhesive sheet of one or more embodiments of the present invention shows respective desired shear adhesive strengths under the temperature environments, and thereby the adhesive sheet of one or more embodiments of the present invention can have excellent adhesion retention performance to the member to be inserted and the inserted member and exhibit higher retention performance even in room temperature and high temperature environments.

The shear adhesive strength of the adhesive sheet of one or more embodiments of the present invention after expansion is measured by the method described in examples described below.

The adhesive sheet of one or more embodiments of the present invention can be produced through a step of forming the thermally expandable thermosetting adhesive layer by applying the thermally expandable thermosetting adhesive composition to a release film and drying it, a step of forming a plurality of patterned sticky parts by printing the sticky agent composition to another release liner in a desired pattern with a gravure coater or the like and drying it, and a step of transferring and pressure bonding the patterned sticky parts to the first principal face of the thermally expandable thermosetting adhesive layer, for example.

The method for producing the adhesive sheet described above can produce the adhesive sheet of any aspect out of an aspect in which the sticky parts are formed on the first principal face of the thermally expandable thermosetting adhesive layer by adjusting the load amount and temperature of pressure bonding as appropriate in the step of transferring and pressure bonding the patterned sticky parts to the first principal face of the thermally expandable thermosetting adhesive layer (the aspect illustrated in FIG. 1A), an aspect in which part of the sticky parts protrudes from the surface of the thermally expandable thermosetting adhesive layer (the aspect illustrated in FIG. 1B), and an aspect in which the sticky parts are buried in the thermally expandable thermosetting adhesive layer (the aspect illustrated in FIG. 3).

When the adhesive sheet of one or more embodiments of the present invention is the aspect having the intermediate layer illustrated in FIG. 6, as a method for producing it, it can be produced through a step of forming the first thermally expandable thermosetting adhesive layer by applying the thermally expandable thermosetting adhesive composition to a release film and drying it, a step of forming the second thermally expandable thermosetting adhesive layer by applying the thermally expandable thermosetting adhesive composition to another release liner and drying it, a step of bonding the intermediate layer to the first thermally expandable thermosetting adhesive layer, a step of bonding the second thermally expandable thermosetting adhesive layer to the face on the opposite side of the intermediate layer from the first thermally expandable thermosetting adhesive layer, a step of forming a plurality of patterned sticky parts by printing the sticky agent composition to the other release liner in a desired pattern with a gravure coater or the like and drying it, and a step of transferring and pressure bonding the patterned sticky parts to the first principal face of the first thermally expandable thermosetting adhesive layer, for example.

The adhesive sheet of one or more embodiments of the present invention preferably expands in the thickness direction by heating and preferably does not substantially expand in the face direction (the flow direction or the width direction).

The adhesive sheet of one or more embodiments of the present invention is not limited to the use of the bonding between the member to be inserted and the inserted member and can be used for the use of simply bonding two members together and the use of filling a cavity of an adherend. By placing the adhesive sheet of one or more embodiments of the present invention in a cavity of an adherend and then expanding it, it can also be used when a configuration in which two or more locations in the cavity are bonded together by the adhesive sheet is formed, for example.

II. Article

One aspect of the article of one or more embodiments of the present invention includes a first adherend and a second adherend, the second adherend being formed with a cavity, the first adherend being disposed in the cavity of the second adherend, and the first adherend and the second adherend being bonded together through an expanded product of the adhesive sheet described in the section "I. Adhesive Sheet" in the cavity.

With the article of the present aspect, the expanded product of the adhesive sheet described in the section "I. Adhesive Sheet" described above is filled between the first adherend and the second adherend in the cavity of the second adherend, and the first adherend and the second adherend are bonded together through the expanded product of the adhesive sheet. In the expanded product of the adhesive sheet, the thermally expandable thermosetting adhesive layer cures by heating to develop adhesive strength and further expands to enable the thermally expandable thermosetting adhesive layer after expansion to be bonded to the adherend not only on the second principal face of the adhesive sheet but also on the first principal face, and thus high adhesive strength can be maintained even under high temperature environments. This effect can provide an article allowing the first adherend to be fixed in the cavity of the second adherend with high positional accuracy and capable of maintaining strong bonding between the first adherend and the second adherend even under high temperature environments.

In the article of the present aspect, one of the first adherend and the second adherend is bonded to the first principal face of the adhesive sheet after expansion, while the other is bonded to the second principal face of the adhesive sheet after expansion. In particular, in view of ease of production of the article capable of easily producing the article regardless of the width and size of the cavity by inserting the first adherend with the adhesive sheet bonded thereto into the cavity, the first adherend is preferably bonded to the first principal face of the adhesive sheet after expansion, while the second adherend is preferably bonded to the second principal face of the adhesive sheet after expansion.

Another aspect of the article of one or more embodiments of the present invention includes a first adherend, a third adherend, and a fourth adherend and has a cavity between the third adherend and the fourth adherend, the first adherend being disposed in the cavity, and the first adherend and the third adherend and the first adherend and the fourth adherend being each bonded together through an expanded product of the adhesive sheet described in the section "I. Adhesive Sheet" described above in the cavity.

With the article of the present aspect, in the cavity provided between the third adherend and the fourth adherend, the expanded product of the adhesive sheet described in the section "I. Adhesive Sheet" described above is filled each between the first adherend and the third adherend and between the first adherend and the fourth adherend, and the first adherend and the third adherend and the first adherend and the fourth adherend are each bonded together through the expanded product of the adhesive sheet. In the expanded product of the adhesive sheet, the thermally expandable thermosetting adhesive layer cures by heating to develop adhesive strength and further expands to enable the thermally expandable thermosetting adhesive layer after expansion to be bonded to the adherend not only on the second principal face of the adhesive sheet but also on the first principal face, and thus high adhesive strength can be maintained even under high temperature environments. This effect can provide an article allowing the first adherend to be fixed in the cavity provided between the third adherend and the fourth adherend with high positional accuracy and capable of maintaining strong bonding between the first adherend, and the third adherend and the fourth adherend even under high temperature environments.

In the article of the present aspect, the first adherend are preferably bonded to the first principal face of the adhesive sheet after expansion, while the third and fourth adherends are each preferably bonded to the second principal face of the adhesive sheet after expansion. In view of ease of production of the article capable of easily producing the article regardless of the width and size of the cavity by inserting the first adherend with the adhesive sheet bonded thereto into the cavity, the first adherend is preferably bonded to the first principal face of the adhesive sheet after expansion, while the third and fourth adherends are each preferably bonded to the second principal face of the adhesive sheet after expansion.

The "expanded product of the adhesive sheet" in the article of one or more embodiments of the present invention is the object after heat expansion of the adhesive sheet described in the section "I. Adhesive Sheet" described above, the details are described in detail in the above section, and thus a description thereof here is omitted. The first to fourth adherends are not limited to particular adherends and can be selected as appropriate in accordance with the type of the article.

The article of one or more embodiments of the present invention is not limited to a particular article because the type of each adherend can be selected as appropriate, and examples thereof include motors for use in automobiles, consumer appliances, robots, and the like.

Examples when the article of one or more embodiments of the present invention is a motor include a combination in which a magnet is used as the first adherend and a rotor formed with a slot is used as the second adherend and a combination in which insulating paper to insulate a stator formed with a slot and a wire disposed in the slot from each other is used as the first adherend and a stator formed with the slot is used as the second adherend.

The article of one or more embodiments of the present invention can be produced by the method for producing an article described below, for example.

III. Method for Producing Article

The method for producing an article of one or more embodiments of the present invention is a method of production bonding two members together through the expanded product of the adhesive sheet described in the section "I. Adhesive Sheet" described above and, in particular, a method of production bonding an inserted member having a cavity and a member to be inserted disposed in the cavity together through the expanded product of the adhesive sheet described in the section "I. Adhesive Sheet" described above.

One aspect of the method for producing an article of one or more embodiments of the present invention includes a step [1A] of bonding the first principal face of the adhesive sheet described in the section "I. Adhesive Sheet" to a surface of a first adherend or a surface of a cavity formed in a second adherend, a step [2A] of inserting the first adherend into the cavity, and a step [3A] of heating the adhesive sheet to expand and cure the thermally expandable thermosetting adhesive layer and to bond the first adherend and the second adherend together through an expanded product of the adhesive sheet.

Figure 7A:
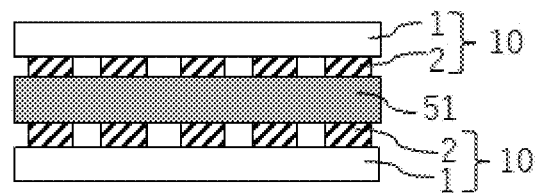
FIGS. 7A-7C are schematic sectional views of an example of a method for producing an article of one or more embodiments of the present invention.
Figure 7B:
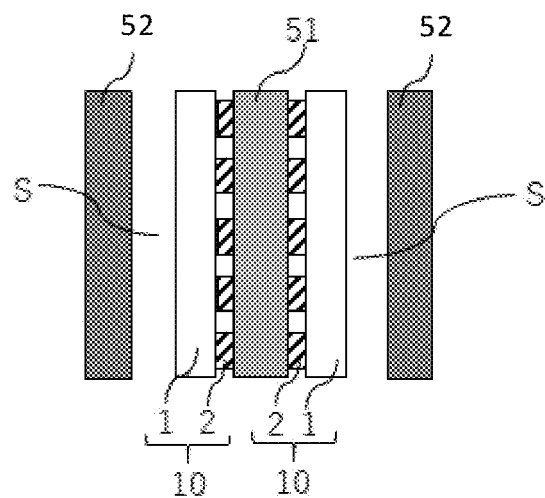
Figure 7C:
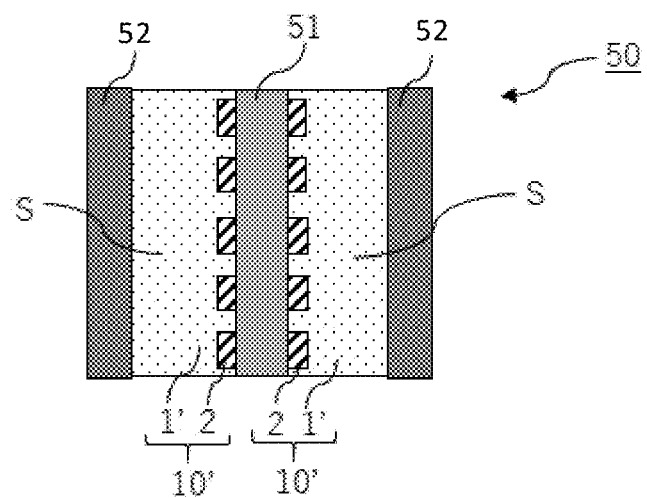

FIGS. 7A-7C are procedure diagrams of an example of the method for producing an article of one or more embodiments of the present invention. First, the first principal face of the adhesive sheet 10 described in the section "I. Adhesive Sheet" (the face having the sticky parts 2) is bonded to either face of a first adherend 51 (FIG. 7A, the step [1A]). Next, the first adherend 51 to which the adhesive sheet 10 is bonded is inserted into a cavity S formed in a second adherend 52 (FIG. 7B, the step [2A]). Subsequently, the adhesive sheet 10 is heated to expand and cure the thermally expandable thermosetting adhesive layer (the symbol 1 in FIG. 7C) to bond the second principal face of the adhesive sheet 10' after expansion (the face on the opposite side from the face having the sticky parts 2) and the second adherend 52 together (FIG. 7C, the step [3A]). In this process, the thermally expandable thermosetting adhesive layer after expansion (the symbol 1' in FIG. 7C) fills the cavity S, and the face on the opposite side of the thermally expandable thermosetting adhesive layer after expansion from the face bonded to the first adherend 51 and the second adherend 52 are bonded together. This procedure produces an article 50 in which the first adherend 51 and the second adherend 52 are bonded together through the adhesive sheet 10' after expansion.

Another aspect of the method for producing an article of one or more embodiments of the present invention includes a step [1B] of bonding the first principal face of the adhesive sheet described in the section "I. Adhesive Sheet" to a surface of a first adherend or a surface of a cavity formed by a third adherend and a fourth adherend, a step [2B] of inserting the first adherend into the cavity, and a step [3B] of heating the adhesive sheet to expand and cure the thermally expandable thermosetting adhesive layer and to bond the first adherend, and the third adherend and the fourth adherend together through an expanded product of the adhesive sheet.

Figure 8A:
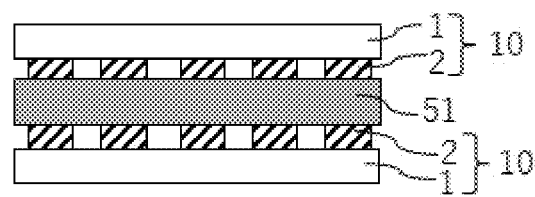
FIGS. 8A-8C are schematic sectional views of an example of the method for producing an article of one or more embodiments of the present invention.
Figure 8B:
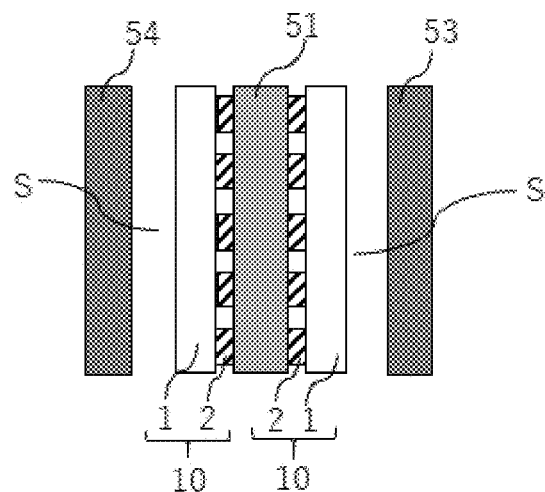
Figure 8C:
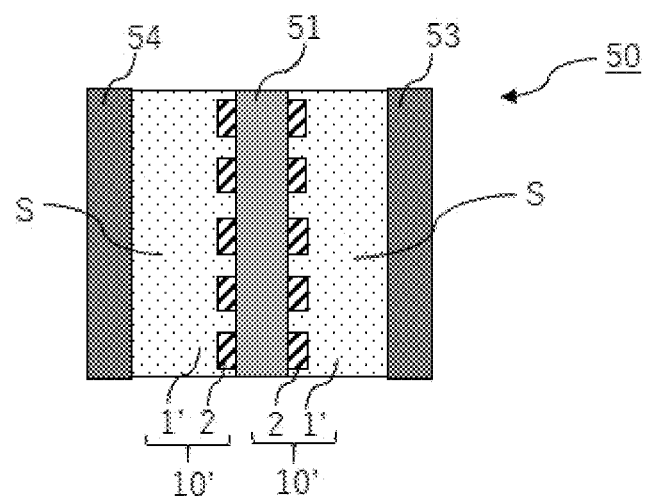

FIGS. 8A-8C is a procedure diagram of another example of the method for producing an article of one or more embodiments of the present invention. First, the first principal face of the adhesive sheet 10 described in the section "I. Adhesive Sheet" (the face on the side having the sticky parts 2) is bonded to either face of the first adherend 51 (FIG. 8A, the step [1B]). Next, the first adherend 51 to which the adhesive sheet 10 is bonded is inserted into a cavity S between a third adherend 53 and a fourth adherend 54 (FIG. 8B, the step [2B]). Subsequently, the adhesive sheet 10 is heated to expand and cure the thermally expandable thermosetting adhesive layer (the symbol 1 in FIG. 8C) to bond the second principal face of the adhesive sheet 10' after expansion (the face on the opposite side from the face having the sticky parts 2), and the third adherend 53 and fourth adherend 54 together (FIG. 8C, the step [3B]). In this process, the thermally expandable thermosetting adhesive layer after expansion (the symbol 1' in FIG. 8C) fills the cavity S, and the surface of the thermally expandable thermosetting adhesive layer after expansion (the symbol 1' in FIG. 8C), and the third adherend 53 and the fourth adherend 54 are bonded together. This procedure produces an article 50 in which one face of the first adherend 51 and the third adherend 53 are bonded together and the other face of the first adherend 51 and the fourth adherend 54 are bonded together through the adhesive sheet 10' after expansion.

The first adherend corresponds to the member to be inserted. The second adherend formed with the cavity and a set of the third adherend and the fourth adherend forming the cavity correspond to the inserted member. Examples of the cavity in the second adherend include holes, grooves, and openings formed in the adherend. Examples of the cavity between the third adherend and the fourth adherend include separation spaces between the third adherend and the fourth adherend that are disposed spaced apart from each other and holes, grooves, and openings formed by the third adherend and the fourth adherend.

In the steps [1A] and [1B], the first principal face of the adhesive sheet is bonded to one surface of the adherend, which is the member to be inserted (insertion member) or the inserted member. In FIGS. 7A-7C and FIGS. 8A-8C, in the steps [1A] and [1B], the first principal face of the adhesive sheet is bonded to either face (two opposite faces) of the first adherend, but the first principal face of the adhesive sheet may be bonded to at least one face of the first adherend, or the first principal face of the adhesive sheet may be bonded to three or more faces thereof.

In the steps [1A] and [1B], the first principal face of the adhesive sheet may be bonded to the first adherend, and in the case of the step [1A], the first principal face of the adhesive sheet may be bonded to the surface of the cavity formed in the second adherend, while in the case of the step [1B], it may be bonded to the surface of the cavity formed by the third adherend and the fourth adherend. In this case, the first principal face of the adhesive sheet may be bonded to one face of the surface of the cavity, or the first principal face of the adhesive sheet may be bonded to two or more faces.

When bonding the first principal face of the adhesive sheet to two or more faces of the surface of the adherend, a single adhesive sheet may be continuously bonded to a plurality of faces of the adherend, or each adhesive sheet may be bonded to each face of the adherend. When bonding the adhesive sheet to the first adherend, for example, the first principal faces of separate adhesive sheets may be bonded to two respective opposite faces of the first adherend to hold the first adherend by the two adhesive sheets, or a single adhesive sheet may be bonded to a plurality of surfaces of the first adherend so as to cover them. Similarly, when bonding the adhesive sheet to the surface of the cavity formed in the second adherend or the cavity formed by the third adherend and the fourth adherend (the surface of the adherend), the first principal faces of separate adhesive sheets may be bonded to two respective opposite faces of the surface of the cavity, or a single adhesive sheet may be bonded to a plurality of surfaces of the cavity so as to cover them.

The conditions for bonding the first principal face of the adhesive sheet to the surface of the adherend are not limited to particular conditions, and bonding is preferably performed in a range of room temperature (23° C.) to 40° C., for example, and bonding is more preferably performed at room temperature (23° C.) Performing bonding at room temperature (23° C.) is preferred in view of the capability of easily performing bonding using the initial adhesiveness of the first principal face of the adhesive sheet and inhibiting the initial adhesive strength of the second principal face of the adhesive sheet from increasing to maintain insert ability.

In the step [2A], the first adherend is inserted into the cavity formed in the second adherend. In the step [2B], the first adherend is inserted into the cavity between the third adherend and the fourth adherend. In the steps [2A] and [2B], the adhesive sheet having been bonded to the adherend has the second principal face positioned on the outermost surface, and thus when the adhesive sheet is bonded to the first adherend, it is difficult for the adhesive sheet to adhere to the cavity surface to enable easy insertion, and even if it adheres thereto, it is difficult for the adhesive sheet to peel off by the force received during insertion, and thus the temporary fixability can be maintained, which improves the insertability. Similarly, when the adhesive sheet is bonded to the cavity surface also, it is difficult for the adhesive sheet to adhere to the first adherend to enable easy insertion, and even if it adheres thereto, it is difficult for the adhesive sheet to peel off by the force received during insertion, and thus the temporary fixability can be maintained, which improves the insertability.

In the steps [3A] and [3B], with the first adherend inserted into the cavity, the adhesive sheet is heated to expand and cure the thermally expandable thermosetting adhesive layer. Heating may be applied directly to the thermally expandable thermosetting adhesive layer of the adhesive sheet or applied to the whole including the adherend. The method of heating may be either a non-contact type or a contact type, and examples of the method of heating include hot air heating, heating by contact with an electric heater, heating by light application such as an infrared heater and a halogen heater, dielectric heating, and induction heating.

The heating temperature in the steps [3A] and [3B] can be set to a temperature at which the thermally expandable thermosetting adhesive layer can expand and cure. In particular, the temperature is preferably a temperature corresponding to the curing temperature of the thermally expandable thermosetting adhesive layer and the expansion temperature of the expansion agent (an expansion starting temperature) and is preferably the expansion temperature of the expansion agent or higher. Specifically, the temperature is preferably 80° C. to 350° C., further preferably 100° C. to 250° C., and more preferably 150° C. to 200° C.

The heating time in the steps [3A] and [3B] can be set to a time in which the thermally expandable thermosetting adhesive layer can expand and cure and is preferably an expansion time or more. Specifically, the heating time is preferably 5 minutes to 300 minutes, more preferably 10 minutes to 200 minutes, and further preferably 20 minutes to 100 minutes. Setting the above heating time can suitably perform inhibition of thermal damage to the adherend and firm bonding of the members.

In the steps [3A] and [3B], the cavity is filled by the adhesive sheet expanding by heating in the cavity, and in the case of the step [3A], the first adherend and the second adherend are bonded together through the expanded product of the adhesive sheet, while in the case of the step [3B], the first adherend, and the third adherend and the fourth adherend are bonded together.

In the cavity, the adhesive sheet expands by heating, thereby enabling the second principal face of the adhesive sheet to come into contact with the adherend to which the adhesive sheet is not provided. In this process, both the expanded products of the thermally expandable thermosetting adhesive layers forming the first principal face and the second principal face of the adhesive sheet develop adhesive strength by heat curing, and thus the first adherend, which is the member to be inserted, and the second adherend or the third adherend and the fourth adherend, which are the inserted member, can be firmly bonded together. In addition, the expanded product of the thermally adhesive thermosetting adhesive layer is a thermally cured product and has high heat resistance and can thus maintain high adhesive strength in high temperature environments.

The article to be obtained by the method for producing an article of one or more embodiments of the present invention is not limited to a particular article, and examples thereof include motors installed in hybrid cars and the like.

Specifically, the motor can be produced by bonding the first principal face of the adhesive sheet and part of a component such as a magnet together in advance, inserting and placing the component to which the adhesive sheet is bonded into a cavity of a core member forming the motor, and then heating the adhesive sheet to expand and cure the thermally expandable thermosetting adhesive layer. Thus, the method for producing an article of one or more embodiments of the present invention is useful as a method for producing a motor.

The present disclosure is not limited to the above embodiments. The above embodiments are by way of example, and any embodiment that has substantially the same configuration as the technical concept described in the claims of the present disclosure and produces similar effects is included in the technical scope of the present disclosure.

EXAMPLES

The following specifically describes one or more embodiments of the present invention with examples.

Preparation Example 1

<Preparation of Thermally Expandable Thermosetting Adhesive Composition (a-1)>

Dissolved in 60 parts by mass of methyl ethyl ketone were 35 parts by mass of an epoxy resin 1 (BPA type, epoxy equivalent weight 8,000 g/eq., solid (25° C.), softening point 200° C. or higher), 7 parts by mass of an epoxy resin 2 (modified BPA type, epoxy equivalent weight 400 g/eq., 1,400,000 mPa·s (25° C.)), 58 parts by mass of an epoxy resin 3 (dicyclopentadiene type, epoxy equivalent weight 280 g/eq., solid (25° C.), softening point 100° C.), 3.8 parts by mass of a curing agent 1 (dicyandiamide, solid), 3 parts by mass of a curing agent 2 (2,4-diamidino-6-[2'-methyl-imidazolyl-(1')]-ethyl-s-triazine isocyanuric acid adduct, solid), and 1 part by mass of an expansion agent 1 (thermally expandable capsules, expansion starting temperature 125° C., solid) to prepare a thermally expandable thermosetting adhesive composition (a-1).

Preparation Example 2

<Preparation of Thermally Expandable Thermosetting Adhesive Composition (a-2)>

A thermally expandable thermosetting resin composition (a-2) was prepared in the same manner as in Preparation Example 1 except that 7 parts by mass of an epoxy resin 4 (BPA type, epoxy equivalent weight 188 g/eq., 11,000 mPa·s (25° C.)) was used instead of the epoxy resin 2, 58 parts by mass of an epoxy resin 5 (modified novolac type, epoxy equivalent weight 160 g/eq., semi-solid (25° C.)) was used instead of the epoxy resin 3, and the amount of use of the curing agent 1 was changed from 3.8 parts by mass to 6.7 parts by mass.

Preparation Example 3

<Preparation of Thermally Expandable Thermosetting Adhesive Composition (a-3)>

A thermally expandable thermosetting adhesive composition (a-3) was prepared in the same manner as in Preparation Example 1 except that the amount of use of the epoxy resin 1 was changed from 35 parts by mass to 25 parts by mass, the amount of use of the epoxy resin 2 was changed from 7 parts by mass to 17 parts by mass, and the amount of use of the curing agent 1 was changed from 3.8 parts by mass to 4.1 parts by mass.

Preparation Example 4

<Preparation of Sticky Agent (b-1)>

Solution polymerized were 97.98 parts by mass of n-butyl acrylate, 2 parts by mass of acrylic acid, and 0.02 part by mass of 4-hydroxybutyl acrylate in an ethyl acetate solution at 90° C. for 6 hours with 0.3 part by mass of azobisisobutyronitrile as a polymerization initiator to obtain an acrylic polymer with a weight average molecular weight of 500,000.

Into 100 parts by mass of the above acrylic polymer, mixed were 5 parts by mass of "D-135" (polymerized rosin ester manufactured by Arakawa Chemical Industries, Ltd.), 20 parts by mass of "KE-100" (disproportionated rosin ester manufactured by Arakawa Chemical Industries, Ltd.), and 25 parts by mass of "FTR 6100" (petroleum resin manufactured by Mitsui Chemicals, Inc.), and further ethyl acetate was added thereto to obtain a sticky agent solution with a solid content adjusted to 40% by mass.

The sticky agent solution and 1.2 parts by mass of "NC40" (isocyanate-based cross-linking agent manufactured by DIC Corporation) were mixed together and were stirred to obtain a sticky agent (b-1).

The peak temperature of tan δ of a sticky agent layer obtained using the sticky agent (b-1) was 0° C. and its gel fraction was 20% by mass.

Example 1

The thermally expandable thermosetting adhesive composition (a-1) obtained in Preparation Example 1 was applied to the surface of a release liner (a 50-μm-thick polyethylene terephthalate film with one face subjected to releasing treatment with a silicone compound) so as to give a thickness after drying of 62 μm using a rod-shaped metal applicator, and the applied object was put in a dryer at 85° C. for 5 minutes to dry it and to obtain a sheet in which a 62-μm-thick sheet-shaped thermally expandable thermosetting adhesive layer (A-1) was formed on one face of the release liner. Two such sheets were produced.

A 25-μm-thick polyimide film was overlaid on the surface of the thermally expandable thermosetting adhesive layer (A-1) of one sheet out of the two sheets obtained above and was bonded thereto at a linear pressure of 3 N/mm with a laminator preheated to 50° C. to laminate the polyimide film on one face of the thermally expandable thermosetting adhesive layer (A-1).

Next, the thermally expandable thermosetting adhesive layer (A-1) of the other sheet was overlaid on the polyimide film side of the laminate and was bonded thereto at a linear pressure of 3 N/mm with a laminator preheated to 50° C. to obtain an adhesive sheet (x-1) with a thickness of 149 μm (excluding the thickness of the release liner. The same applies hereinafter), in which the thermally expandable thermosetting adhesive layer (A-1) is laminated on either face of the polyimide film.

Next, the sticky agent (b-1) was dot printed on the surface of a release liner (a 25-μm-thick polyethylene terephthalate film with one face subjected to releasing treatment with a silicone compound) using a gravure coater and was dried at 85° C. for 2 minutes to form a plurality of substantially circular, island-like sticky parts (B-1) with a thickness of 3 μm and an area per one of 0.5 mm². The shortest distance between any sticky part (b1) selected from two or more sticky parts (B-1) and a sticky part (b2) close to the sticky part (b1) was 0.2 mm.

Next, the release liner on one face of the adhesive sheet (x-1) was peeled off, and one thermally expandable thermosetting adhesive layer (A-1) of the adhesive sheet (x-1) and the sticky parts (B-1) were overlaid on each other and were bonded together at a linear pressure of 3 N/mm with a 23° C. laminator to obtain an adhesive sheet (X-1).

The total thickness of the adhesive sheet (X-1) was 152 μm, and the sticky parts (B-1) were laminated on one face of the thermally expandable thermosetting adhesive layer (A-1). That is, as illustrated in FIG. 1A, in the thickness direction of the adhesive sheet (X-1), the first face of the sticky parts (B-1) was positioned outside the first principal face of one thermally expandable thermosetting adhesive layer (A-1), while the second face of the sticky parts (B-1) was in contact with the first principal face of the one thermally expandable thermosetting adhesive layer (A-1). The total area proportion of the sticky parts (B-1) with respect to the area of the first principal face of the adhesive sheet (X-1) was 60%.

As illustrated in FIG. 2A, in the adhesive sheet (X-1) after heating at 150° C. for 60 minutes, in the thickness direction, the first face of the sticky parts (B-1) was at the same position as the first principal face of the one thermally expandable thermosetting adhesive layer (A-1), while the second face of the sticky parts (B-1) was positioned between the first principal face and the second principal face of the one thermally expandable thermosetting adhesive layer (A-1). The thermally expandable thermosetting adhesive layers (A-1) after curing (after expansion) in the adhesive sheet (X-1) after heating at 150° C. for 60 minutes each had an expansion rate of 390% and a glass transition temperature of 157° C. The expansion rate and the glass transition temperature were measured by the methods described in the section "I. Adhesive Sheet" described above. The same shall apply to the following examples and comparative examples.

Example 2

The thermally expandable thermosetting adhesive layer (A-1) of the adhesive sheet (x-1) and the sticky parts (B-1) were overlaid on each other to obtain an adhesive sheet (X-2) in the same manner as in Example 1 except that the laminating temperature during bonding was changed from 23° C. to 50° C. The shortest distance between any sticky part (b1) selected from two or more sticky parts (B-1) and a sticky part (b2) close to the sticky part (b1) was 0.2 mm.

The total thickness of the adhesive sheet (X-2) was 149 µm, and the sticky parts (B-1) were buried in one face of the thermally expandable thermosetting adhesive layer (A-1). That is, as illustrated in FIG. 3, in the thickness direction of the adhesive sheet (X-2), the first face of the sticky parts (B-1) was at the same position as the first principal face of the one thermally expandable thermosetting adhesive layer (A-1), while the second face of the sticky parts (B-1) was positioned between the first principal face and the second principal face of the one thermally expandable thermosetting adhesive layer (A-1). The total area proportion of the sticky parts (B-1) with respect to the area of the first principal face of the adhesive sheet (X-2) was 60%.

As illustrated in FIG. 2A, in the adhesive sheet (X-2) after heating at 150° C. for 60 minutes, in the thickness direction, the first face of the sticky parts (B-1) was at the same position as the first principal face of the one thermally expandable thermosetting adhesive layer (A-1), while the second face of the sticky parts (B-1) was positioned between the first principal face and the second principal face of the one thermally expandable thermosetting adhesive layer (A-1). The thermally expandable thermosetting adhesive layers (A-1) after curing (after expansion) in the adhesive sheet (X-2) after heating at 150° C. for 60 minutes each had an expansion rate of 390% and a glass transition temperature of 157° C.

Example 3

An adhesive sheet (X-3) was obtained in the same manner as in Example 1 except that a plurality of substantially circular sticky parts (B-2) with a thickness of 3 µm and an area per one of 0.3 mm² were formed on a release liner instead of the sticky parts (B-1), and the one thermally expandable thermosetting adhesive layer (A-1) of the adhesive sheet (X-1) and the sticky parts (B-2) were overlaid on each other. The shortest distance between any sticky part (b1) selected from two or more sticky parts (B-2) and a sticky part (b2) close to the sticky part (b1) was 0.2 mm.

The total thickness of the adhesive sheet (X-3) was 152 µm, and the sticky parts (B-2) were laminated on one face of the thermally expandable thermosetting adhesive layer (A-1). That is, as illustrated in FIG. 1A, in the thickness direction of the adhesive sheet (X-3), the first face of the sticky parts (B-2) was positioned outside the first principal face of the one thermally expandable thermosetting adhesive layer (A-1), while the second face of the sticky parts (B-2) was in contact with the first principal face of the one thermally expandable thermosetting adhesive layer (A-1).

The total area proportion of the sticky parts (B-2) with respect to the area of the first principal face of the adhesive sheet (X-3) was 37%.

As illustrated in FIG. 2A, in the adhesive sheet (X-3) after heating at 150° C. for 60 minutes, in the thickness direction, the first face of the sticky parts (B-2) was at the same position as the first principal face of the one thermally expandable thermosetting adhesive layer (A-1), while the second face of the sticky parts (B-2) was positioned between the first principal face and the second principal face of the one thermally expandable thermosetting adhesive layer (A-1). The thermally expandable thermosetting adhesive layers (A-1) after curing (after expansion) in the adhesive sheet (X-3) after heating at 150° C. for 60 minutes each had an expansion rate of 390% and a glass transition temperature of 157° C.

Example 4

Two sheets were produced in which a sheet-shaped thermally expandable thermosetting adhesive layer (A-2) with a thickness changed from 62 µm to 75 µm was formed on one face of a release liner instead of the sheet-shaped thermally expandable thermosetting adhesive layer (A-1), and the other thermally expandable thermosetting adhesive layer (A-2) was overlaid on the surface of one thermally expandable thermosetting adhesive layer (A-2) and was bonded thereto at a linear pressure of 3 N/mm with a laminator preheated to 50° C. to obtain an adhesive sheet (x-4) with a thickness of 150 µm including the thermally expandable thermosetting adhesive layers (A-2) laminated on each other. An adhesive sheet (X-4) was obtained in the same manner as in Example 1 except that the adhesive sheet (x-4) was used instead of the adhesive sheet (x-1).

The total thickness of the adhesive sheet (X-4) was 153 µm, and the sticky parts (B-1) were laminated on one face of the thermally expandable thermosetting adhesive layer (A-2). That is, as illustrated in FIG. 1A, in the thickness direction of the adhesive sheet (X-4), the first face of the sticky parts (B-1) was positioned outside the first principal face of the one thermally expandable thermosetting adhesive layer (A-2), while the second face of the sticky parts (B-1) was in contact with the first principal face of the one thermally expandable thermosetting adhesive layer (A-2).

The total area proportion of the sticky parts (B-1) with respect to the area of the first principal face of the adhesive sheet (X-4) was 60%.

As illustrated in FIG. 2A, in the adhesive sheet (X-4) after heating at 150° C. for 60 minutes, in the thickness direction, the first face of the sticky parts (B-1) was at the same position as the first principal face of the one thermally expandable thermosetting adhesive layer (A-2), while the second face of the sticky parts (B-1) was positioned between the first principal face and the second principal face of the one thermally expandable thermosetting adhesive layer (A-2). The thermally expandable thermosetting adhesive layers (A-2) after curing (after expansion) in the adhesive sheet (X-4) after heating at 150° C. for 60 minutes each had an expansion rate of 390% and a glass transition temperature of 157° C.

Example 5

An adhesive sheet (X-5) was obtained in the same manner as in Example 1 except that two sheets were produced in which a thermally expandable thermosetting adhesive layer (A-3) was formed on one face of a release liner using the thermally expandable thermosetting adhesive composition (a-2) instead of the thermally expandable thermosetting adhesive composition (a-1), and the thermally expandable thermosetting adhesive layer (A-3) was laminated on either face of the polyimide film instead of the thermally expandable thermosetting adhesive layer (A-1) on either face of the polyimide film.

The total thickness of the adhesive sheet (X-5) was 152 μm, and the sticky parts (B-1) were laminated on one face of the thermally expandable thermosetting adhesive layer (A-3). That is, as illustrated in FIG. 1A, in the thickness direction of the adhesive sheet (X-5), the first face of the sticky parts (B-1) was positioned outside the first principal face of one thermally expandable thermosetting adhesive layer (A-3), while the second face of the sticky parts (B-1) was in contact with the first principal face of the one thermally expandable thermosetting adhesive layer (A-3). The total area proportion of the sticky parts (B-1) with respect to the area of the first principal face of the adhesive sheet (X-5) was 60%.

As illustrated in FIG. 2A, in the adhesive sheet (X-5) after heating at 150° C. for 60 minutes, in the thickness direction, the first face of the sticky parts (B-1) was at the same position as the first principal face of the one thermally expandable thermosetting adhesive layer (A-3), while the second face of the sticky parts (B-1) was positioned between the first principal face and the second principal face of the one thermally expandable thermosetting adhesive layer (A-3). The thermally expandable thermosetting adhesive layers (A-3) after curing (after expansion) in the adhesive sheet (X-5) after heating at 150° C. for 60 minutes each had an expansion rate of 415% and a glass transition temperature of 172° C.

Example 6

An adhesive sheet (X-6) was obtained in the same manner as in Example 1 except that two sheets were produced in which a thermally expandable thermosetting adhesive layer (A-4) was formed on one face of a release liner using the thermally expandable thermosetting adhesive composition (a-3) instead of the thermally expandable thermosetting adhesive composition (a-1), and the thermally expandable thermosetting adhesive layer (A-4) was laminated on either face of the polyimide film instead of the thermally expandable thermosetting adhesive layer (A-1).

The total thickness of the adhesive sheet (X-6) was 152 μm, and the sticky parts (B-1) were laminated on one face of the thermally expandable thermosetting adhesive layer (A-4). That is, as illustrated in FIG. 1A, in the thickness direction of the adhesive sheet (X-6), the first face of the sticky parts (B-1) was positioned outside the first principal face of one thermally expandable thermosetting adhesive layer (A-4), while the second face of the sticky parts (B-1) was in contact with the first principal face of the one thermally expandable thermosetting adhesive layer (A-4). The total area proportion of the sticky parts (B-1) with respect to the area of the first principal face of the adhesive sheet (X-6) was 60%.

As illustrated in FIG. 2A, in the adhesive sheet (X-6) after heating at 150° C. for 60 minutes, in the thickness direction, the first face of the sticky parts (B-1) was at the same position as the first principal face of the one thermally expandable thermosetting adhesive layer (A-4), while the second face of the sticky parts (B-1) was positioned between the first principal face and the second principal face of the one thermally expandable thermosetting adhesive layer (A-4). The thermally expandable thermosetting adhesive layers (A-4) after curing (after expansion) in the adhesive sheet (X-6) after heating at 150° C. for 60 minutes each had an expansion rate of 424% and a glass transition temperature of 145° C.

Comparative Example 1

The sticky agent (b-1) was applied to the entire surface of a release liner (a 25-μm-thick polyethylene terephthalate film with one face subjected to releasing treatment with a silicone compound) using a gravure coater and was then dried at 85° C. for 2 minutes to obtain a sheet in which a 3-μm-thick, sheet-shaped sticky layer (B'-1) was formed on one face of the release liner. An adhesive sheet (X'-1) was obtained in the same manner as in Example 1 except that the sticky layer (B'-1) was used instead of the sticky parts (B-1).

The total thickness of the adhesive sheet (X'-1) was 152 μm, and the sticky layer (B'-1) was laminated on one face of the thermally expandable thermosetting adhesive layer (A-1). Of the surface of the adhesive sheet (X'-1), the sticky layer (B'-1) side was defined as the first principal face, while the thermally expandable thermosetting adhesive layer (A-1) side was defined as the second principal face.

The sticky layer (B'-1) was non-patterned and was provided on the entire one face of the thermally expandable thermosetting adhesive layer (A-1), and thus the total area proportion of the sticky layer (B'-1) with respect to the area of the first principal face of the adhesive sheet (X'-1) was 100%. The expansion rate and the glass transition temperature of the thermally expandable thermosetting adhesive layer (A-1) after curing (after expansion) in the adhesive sheet (X'-1) after heating at 150° C. for 60 minutes were the same as the expansion rate and the glass transition temperature of the thermally expandable thermosetting adhesive layer (A-1) in Example 1, respectively.

Comparative Example 2

The adhesive sheet (x-1) obtained in Example 1 was evaluated as an adhesive sheet (X'-2).

The total thickness of the adhesive sheet (X'-2) was 149 μm.

The adhesive sheet (X'-2) did not have the sticky parts, and thus the total area proportion of the sticky parts with respect to the area of one face of the adhesive sheet (X'-2) was 0%. Of the surface of the adhesive sheet (X'-2), the face on the one thermally expandable thermosetting adhesive layer (A-1) side was defined as the first principal face, while the face on the other thermally expandable thermosetting adhesive layer (A-1) side was defined as the second principal face. The expansion rate and the glass transition temperature of the thermally expandable thermosetting adhesive layer (A-1) after curing (after expansion) in the adhesive sheet (X'-2) after heating at 150° C. for 60 minutes were the same as the expansion rate and the glass transition temperature of the thermally expandable thermosetting adhesive layer (A-1) in Example 1, respectively.

[Method for Measuring Shear Adhesive Strength of Thermally Expandable Thermosetting Adhesive Layer Before Heating]

The release liners provided with the thermally expandable thermosetting adhesive layers (A-1) to (A-4) obtained in the examples and the comparative examples were cut into a size of 10 mm×10 mm, which were used as test samples. Two smooth-surfaced aluminum plates (15 mm wide×70 mm long×0.5 mm thick) were degreased, and the face of the test sample on the thermally expandable thermosetting adhesive layer side was joined to the top face of one aluminum plate and was pressure bonded thereto at 23° C. using a 2 kg hand roller.

Next, the release liner of the test sample pressure bonded to the aluminum plate was peeled off, and the other aluminum plate having a degreased, smooth surface was overlaid on the top face of the test sample and was pressure bonded thereto at 23° C. for 10 seconds with a load of 0.5 MPa. After being left under a 23° C. environment for 30 minutes, the ends of the two aluminum plates were each chucked, and an adhesive strength in a shear direction when a tensile test was performed at 10 mm/minute in a 180° direction using a Tensilon tensile testing machine [manufactured by A & D Company, Limited, model: RTM-100] was measured.

[Method for Measuring Shear Adhesive Strength of Sticky Parts]

The release liners formed with the sticky parts (B-1) and (B-2) obtained in the examples and the comparative examples were cut into a size of 10 mm×10 mm, which were used as test samples. Two smooth-surfaced aluminum plates (15 mm wide×70 mm long×0.5 mm thick) were degreased, and the face of the test sample on the sticky parts side was joined to the top face of one aluminum plate and was pressure bonded thereto at 23° C. using a 2 kg hand roller.

Next, the release liner of the test sample pressure bonded to the aluminum plate was peeled off, and the other aluminum plate having a degreased, smooth surface was overlaid on the top face of the test sample and was pressure bonded thereto at 23° C. for 10 seconds with a load of 0.5 MPa. After being left under a 23° C. environment for 30 minutes, the ends of the two aluminum plates were each chucked, and an adhesive strength in a shear direction when a tensile test was performed at 10 mm/minute in a 180° direction using a Tensilon tensile testing machine [manufactured by A & D Company, Limited, model: RTM-100] was measured.

[Measurement of Shear Adhesive Strength of First Face and Second Face of Adhesive Sheet Before Heating]

The adhesive sheets of the examples and the comparative examples were cut into a size of 10 mm×10 mm, which were used as test samples. Two smooth-surfaced aluminum plates (15 mm wide×70 mm long×0.5 mm thick) were degreased, and a two-component mixing, room temperature curing type acrylic adhesive (Metal Lock manufactured by Cemedine Co. Ltd.) as a strong adhesive for test sample fixation was applied to the top face of one aluminum plate. The release liner on the second principal face side of the test sample was peeled off, the second principal face of the test sample was overlaid on the one aluminum plate through the strong adhesive, and the sample was pressure bonded thereto at 23° C. using a 2 kg hand roller. Next, the release liner of the test sample pressure bonded to the aluminum plate on the first principal face side was peeled off, and the other aluminum plate having a degreased, smooth surface was overlaid on the top face of the test sample and was pressure bonded thereto at 23° C. for 10 seconds with a load of 0.5 MPa. After being left under a 23° C. environment for 5 minutes, the ends of the two aluminum plates were each chucked, and an adhesive strength in a shear direction when a tensile test was performed at 10 mm/minute in a 180° direction using a Tensilon tensile testing machine [manufactured by A & D Company, Limited, model: RTM-100] was measured. The adhesive strength at this time was defined as the shear adhesive strength of the first principal face of the adhesive sheet.

An adhesive strength in a shear direction was measured in the same manner as in the above method of measurement except that the first principal face of the test sample with the release liner peeled off and one aluminum plate were pressure bonded together through the strong adhesive, while the other aluminum plate and the second principal face of the test sample were pressure bonded together. The adhesive strength at this time was defined as the shear adhesive strength of the second principal face of the adhesive sheet.

[Method for Evaluating Temporary Fixability of Adhesive Sheet to Member]

The adhesive sheets (X-1) to (X-6) and (X'-1) and (X'-2) obtained in the examples and the comparative examples were cut into a size of 15 mm×15 mm, which were used as test samples. Next, the above test sample, from which the release liner on the first principal face (the face on the side having the sticky parts or the sticky layer) side was peeled off, was overlaid on the center of a degreased, smooth SUS plate (40 mm wide×50 mm long×3 mm thick) and was pressure bonded thereto at 23° C. for 10 seconds with a load of 0.5 MPa to fix the test sample. The adhesive sheet (X'-2) produced in Comparative Example 2, from which the release liner on one principal face side was peeled off, was pressure bonded to a SUS plate to be fixed.

Subsequently, the SUS plate was erected so as to be 90° with respect to the floor under 23° C., and the SUS plate was lifted so as to position the test sample bonded to the SUS plate at a height of 15 cm from the floor and was vertically dropped. This operation was repeated 10 times. Subsequently, the amount of deviation caused by the dropping of the fixed test sample was measured, and the temporary fixability to the member was evaluated in accordance with the following criteria.

(Criteria)

⊚: The amount of deviation of the test sample was 0 mm.

○: The amount of deviation of the test sample was less than 1 mm.

Δ: The amount of deviation of the test sample was 1 mm or more.

X: The test sample peeled off from the SUS plate.

[Method for Evaluating Insertability of Adhesive Sheet into Member]

The adhesive sheets (X-1) to (X-6) and (X'-1) and (X'-2) obtained in the examples and the comparative examples were cut into a size of 15 mm×15 mm. Next, the adhesive sheet, from which the release liner on the first principal face (the face on the side having the sticky parts or the sticky layer) side was peeled off, was overlaid on the center of a degreased, smooth SUS plate (30 mm wide×30 mm long×1 mm thick) and was pressure bonded thereto at 23° C. for 10 seconds with a load of 0.5 MPa to fix the adhesive sheet. The adhesive sheet (X'-2) produced in Comparative Example 2, from which the release liner on one principal face side was peeled off, was pressure bonded to a SUS plate to be fixed. Subsequently, the other release liner of the adhesive sheet was removed, which was used as a test sample.

Next, two smooth glass plates (70 mm wide×50 mm long×1.5 mm thick) were prepared, and two spacers (5 mm widex50 mm long) were placed on one glass plate (C1) in parallel with a 60 mm spacing and were bonded thereto. Subsequently, the other glass plate (C2) was overlaid on the spacers to be bonded to the spacers to produce a cavity formed by two pieces of glass and two spacers.

Subsequently, the test sample was erected so as to be 90° with respect to the floor, was inserted vertically into the cavity formed by two pieces of glass and two spacers, and was passed therethrough. The thickness of the spacers allowing the test sample to pass without adhering to the glass was measured, and the insertability of the test sample to the member was evaluated in accordance with the following determination.

(Criteria)
- ⊚: The test sample was able to pass even when the thickness of the spacers was increased by 50 μm with respect to the total thickness of the adhesive sheet and the SUS plate.
- ○: The test sample could not pass when the thickness of the spacers was increased by 50 μm with respect to the total thickness of the adhesive sheet and the SUS plate but was able to pass when the thickness was increased by 75 μm.
- Δ: The test sample could not pass when the thickness of the spacers was increased by 75 μm with respect to the total thickness of the adhesive sheet and the SUS plate but was able to pass when the thickness was increased by 100 μm.
- X: The test sample could not pass even when the thickness of the spacers was increased by 100 μm with respect to the total thickness of the adhesive sheet and the SUS plate, or the adhesive sheet peeled off from the SUS plate when passing it.

[Method for Measuring Shear Adhesive Strength of Adhesive Sheet after Heating (after Expansion)]

Figure 9:
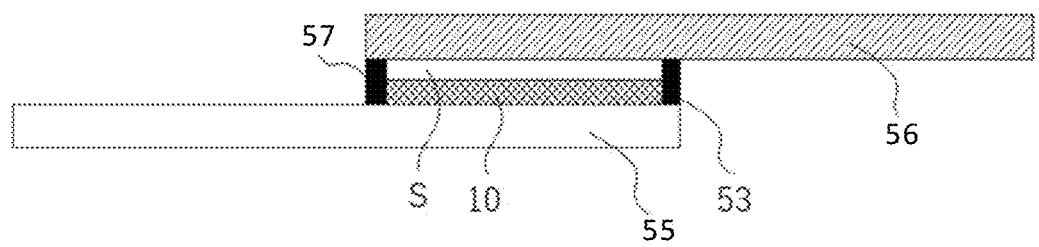
FIG. 9 is a schematic diagram of a method for measuring the shear adhesive strength of the adhesive sheet after heating (after expansion).

Two smooth-surfaced aluminum plates 55 and 56 (15 mm widex70 mm longx0.5 mm thick) were degreased, and two spacers 57 (5 mm wide) were placed on the ends of the top face of one aluminum plate 55 in parallel with a 12 mm spacing and were bonded thereto as in FIG. 9. The spacers 57 that were prepared in such a manner that the total thickness of the spacers 57 and the adhesive tape used for bonding was larger than the total thickness of the adhesive sheet by 150 μm were used. Next, the adhesive sheets (X-1) to (X-6) and (X'-1) and (X'-2) (the symbol 10 in FIG. 9) of the examples and the comparative examples cut into a size of 10 mm×10 mm in advance, from which the release liner on the first principal face (the face on the side having the sticky parts or the sticky layer) side of the adhesive sheet was peeled off, were each bonded to the top face side of the aluminum plate 55 and between the two spacers 57 and were each pressure bonded thereto using a 2 kg hand roller. The adhesive sheet (X'-2) produced in Comparative Example 2, from which the release liner on one principal face side was peeled off, was bonded thereto and was pressure bonded thereto using a 2 kg hand roller.

Next, the release liner on the second principal face (the thermally expandable thermosetting adhesive layer) side of the adhesive sheet 10 was peeled off, and the other aluminum plate 56 (15 mm widex70 mm longx0.5 mm thick) having a degreased, smooth surface was placed on the second principal face (the top face of the thermally expandable thermosetting adhesive layer) of the adhesive sheet 10, and these were fixed to each other with a clip. The adhesive sheet (X'-2) produced in Comparative Example 2, from which the release liner on the other principal face side was peeled off, was placed on the other aluminum plate 56. The above fixed object was heated at 150° C. for 60 minutes and was then left under a 23° C. environment for 30 minutes to be cooled. Next, with the object from which the clip was removed as a test sample, the ends of the two aluminum plates 55 and 56 were each chucked, and adhesive strengths in a shear direction when a tensile test was performed at 10 mm/minute in a 180° direction at 23° C. and 150° C. using a Tensilon tensile testing machine [manufactured by A & D Company, Limited, model: RTM-100] were each measured.

The tables below list the evaluation results.

TABLE 1

| | | | Example 1 | Example 2 | Example 3 | Example 4 |
|---|---|---|---|---|---|---|
| Configuration of adhesive sheet | Thermally expandable thermosetting adhesive layer (sheet second principal face side) | Adhesive type | (a-1) | (a-1) | (a-1) | (a-1) |
| | | Thickness [μm] | 62 | 62 | 62 | 75 |
| | | Shear adhesive strength before heating [MPa] | 0.2 | 0.2 | 0.2 | 0.3 |
| | Base | Type | PI | PI | PI | — |
| | | Thickness [μm] | 25 | 25 | 25 | — |
| | Thermally expandable thermosetting adhesive layer (sheet first principal face side) | Adhesive type | (a-1) | (a-1) | (a-1) | (a-1) |
| | | Thickness [μm] | 62 | 62 | 62 | 75 |
| | Sticky parts | Sticky agent type | (b-1) | (b-1) | (b-1) | (b-1) |
| | | Shape | Substantially circular shape | Substantially circular shape | Substantially circular shape | Substantially circular shape |
| | | Thickness [μm] | 3 | 3 | 3 | 3 |
| | | Area per | 0.5 | 0.5 | 0.3 | 0.5 |

TABLE 1-continued

|  |  | Example 1 | Example 2 | Example 3 | Example 4 |
|---|---|---|---|---|---|
|  | one [mm$^2$] |  |  |  |  |
|  | Shear adhesive strength before heating [MPa] | 0.9 | 0.9 | 0.5 | 0.9 |
| Total thickness of adhesive sheet [μm] |  | 152 | 149 | 152 | 152 |
| Total area proportion of sticky parts [%] |  | 60 | 60 | 37 | 60 |
| Shear adhesive strength of first principal face of adhesive sheet before heating [MPa] |  | 0.7 | 0.8 | 0.5 | 0.7 |
| Shear adhesive strength of second principal face of adhesive sheet before heating [MPa] |  | 0.2 | 0.2 | 0.2 | 0.3 |
| Temporary fixability to member |  | ⊚ | ⊚ | ○ | ⊚ |
| Insertability into member |  | ⊚ | ⊚ | ⊚ | ⊚ |
| Shear adhesive strength of adhesive sheet after heating (after expansion) [MPa] | 23° C. | 8.0 | 8.4 | 9.3 | 7.5 |
|  | Under 150° C. heating | 4.8 | 5.0 | 5.4 | 4.4 |

TABLE 2

|  |  |  | Example 5 | Example 6 | Comparative Example 1 | Comparative Example 2 |
|---|---|---|---|---|---|---|
| Configuration of adhesive sheet | Thermally expandable thermosetting adhesive layer (sheet second principal face side) | Adhesive type | (a-2) | (a-3) | (a-1) | (a-1) |
|  |  | Thickness [μm] | 62 | 62 | 62 | 62 |
|  |  | Shear adhesive strength before heating [MPa] | 0.1 | 0.4 | 0.2 | 0.2 |
|  | Base | Type | PI | PI | PI | PI |
|  |  | Thickness [μm] | 25 | 25 | 25 | 25 |
|  | Thermally expandable thermosetting adhesive layer (sheet first principal face side) | Adhesive type | (a-2) | (a-3) | (a-1) | (a-1) |
|  |  | Thickness [μm] | 62 | 62 | 62 | 62 |
|  | Sticky parts | Sticky agent type | (b-1) | (b-1) | (b-1) | — |
|  |  | Shape | Substantially circular shape | Substantially circular shape | — | — |
|  |  | Thickness [μm] | 3 | 3 | 3 | — |
|  |  | Area per one [mm$^2$] | 0.5 | 0.5 | — | — |
|  |  | Shear adhesive strength before heating [MPa] | 0.9 | 0.9 | 1.2 | — |
| Total thickness of adhesive sheet [μm] |  |  | 152 | 152 | 152 | 149 |
| Total area proportion of sticky parts [%] |  |  | 60 | 60 | 100 | 0 |
| Shear adhesive strength of first principal face of adhesive sheet before heating [MPa] |  |  | 0.7 | 0.7 | 1.1 | 0.2 |
| Shear adhesive strength of second principal face of adhesive sheet before heating [MPa] |  |  | 0.1 | 0.4 | 0.2 | 0.2 |
| Temporary fixability to member |  |  | ⊚ | ⊚ | ⊚ | X |
| Insertability into member |  |  | ⊚ | ○ | ⊚ | X |

TABLE 2-continued

|  |  | Example 5 | Example 6 | Comparative Example 1 | Comparative Example 2 |
|---|---|---|---|---|---|
| Shear adhesive strength of adhesive sheet after heating (after expansion) [MPa] | 23° C. | 8.2 | 7.8 | 4.8 | 9.5 |
|  | Under 150° C. heating | 6.0 | 3.9 | 0.8 | 5.5 |

The adhesive sheets of Examples 1 to 6 had good temporary fixability and insertability before expansion and had high room temperature and high temperature adhesive strengths after expansion. Comparative Example 1, in which the sticky parts are not provided on the first principal face of the adhesive sheet in a patterned manner (the sticky layer is provided on the entire one face of the thermally expandable thermosetting adhesive layer), on the other hand, had good temporary fixability and insertability before expansion but had lower room temperature and high temperature adhesive strengths after expansion than those of the adhesive sheets of the examples, indicating that it was poor especially in high temperature adhesiveness. Comparative Example 2, in which the sticky parts are not provided on the surface of the thermally expandable thermosetting adhesive layer on the first principal face of the adhesive sheet, had high room temperature and high temperature adhesive strengths after expansion comparable to those of the adhesive sheets of the examples but could not obtain temporary fixability before expansion and, in the evaluation of insertability, got involved in interference in the insertion of the test sample caused by the fact that the adhesive sheet peeled off when the test sample was passed, and could not obtain insertability, either.

REFERENCE SIGNS LIST 1, 1A, 1B thermally expandable thermosetting adhesive layer
1' thermally expandable thermosetting adhesive layer after expansion (expanded product of thermally expandable thermosetting adhesive layer)
2 sticky parts
3 intermediate layer
10 adhesive sheet
10' adhesive sheet after expansion (expanded product of adhesive sheet)
Z-Z' thickness direction of adhesive sheet
a1, a11, a12 first principal face of thermally expandable thermosetting adhesive layer
a2, a21, a22 second principal face of thermally expandable thermosetting adhesive layer
b1 first face of sticky parts
b2 second face of sticky parts
50 article Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. An adhesive sheet comprising:
a first principal face; and
a second principal face,
wherein
the first principal face and the second principal face are opposite to each other,
the first principal face of the adhesive sheet includes a thermally expandable thermosetting adhesive layer and a plurality of sticky parts provided on a first principal face of the thermally expandable thermosetting adhesive layer in a patterned manner, and
the second principal face of the adhesive sheet includes the same thermally expandable thermosetting adhesive layer forming the first principal face of the adhesive sheet, or another thermally expandable thermosetting adhesive layer.

2. The adhesive sheet according to claim 1, wherein the first principal face of the adhesive sheet has a higher shear adhesive strength than a shear adhesive strength of the second principal face.

3. The adhesive sheet according to claim 1, wherein
the plurality of sticky parts have a first face and a second face opposite to the first face,
before expansion, in a thickness direction of the adhesive sheet, the first face of the plurality of sticky parts is positioned outside the first principal face of the thermally expandable thermosetting adhesive layer provided with the plurality of sticky parts, while the second face of the plurality of sticky parts is in contact with the first principal face of the thermally expandable thermosetting adhesive layer provided with the plurality of sticky parts or is positioned between the first principal face of the thermally expandable thermosetting adhesive layer and the second principal face opposite to the first face, and
after expansion, in the thickness direction of the adhesive sheet, the first face of the plurality of sticky parts is positioned at a same position as the first principal face of the thermally expandable thermosetting adhesive layer after expansion provided with the plurality of sticky parts or between the first principal face and the second principal face opposite to the first principal face, while the second face of the plurality of sticky parts is positioned between the first principal face of the thermally expandable thermosetting adhesive layer after expansion provided with the plurality of sticky parts and the second principal face opposite to the first principal face.

4. The adhesive sheet according to claim 1, wherein
the plurality of sticky parts have a first face and a second face opposite to the first face,
before expansion, in a thickness direction of the adhesive sheet, the first face of the plurality of sticky parts is at a same position as the first principal face of the thermally expandable thermosetting adhesive layer provided with the plurality of sticky parts, while the second face of the plurality of sticky parts is positioned between the first principal face of the thermally expandable thermosetting adhesive layer provided with the plurality of sticky parts and the second principal face opposite to the first principal face, and after expansion, in the thickness direction of the adhesive sheet, the first face of the plurality of sticky parts is positioned at a same position as the first principal face of the thermally expandable thermosetting adhesive layer after expansion provided with the plurality of sticky parts or between the first principal face and the second principal face opposite to the first principal face, while the second face of the plurality of sticky parts is positioned between the first principal face of the thermally expandable thermosetting adhesive layer after expansion provided with the plurality of sticky parts and the second principal face opposite to the first principal face.

5. The adhesive sheet according to claim 1, wherein the first principal face of the adhesive sheet has a shear adhesive strength of 0.2 MPa or more.

6. The adhesive sheet according to claim 1, wherein the second principal face of the adhesive sheet has a shear adhesive strength of less than 0.5 MPa.

7. The adhesive sheet according to claim 1, wherein the plurality of sticky parts have a total area proportion with respect to the first principal face of the adhesive sheet before expansion in a planar view of 20% or more and 80% or less.

8. The adhesive sheet according to claim 1, wherein the plurality of sticky parts have a gel fraction of 60% by mass or less.

9. The adhesive sheet according to claim 1, wherein the plurality of sticky parts contain an acrylic resin.

10. The adhesive sheet according to claim 1, wherein the plurality of sticky parts have a planar view shape of a substantially circular shape, a substantially quadrilateral shape, or a substantially hexagonal shape.

11. The adhesive sheet according to claim 1, wherein the thermally expandable thermosetting adhesive layer forming the second principal face of the adhesive sheet contains a liquid thermosetting resin with a viscosity of 3,000,000 mPa·sec or less at 25° C. in 20% by mass or less in an entire resin component of the thermally expandable thermosetting adhesive layer.

12. The adhesive sheet according to claim 1, wherein the thermally expandable thermosetting adhesive layer forming the second principal face of the adhesive sheet has a glass transition temperature after expansion of 80° C. or higher.

13. An article comprising:
a first adherend; and
a second adherend,
wherein
the second adherend being formed with a cavity,
the first adherend is disposed in the cavity of the second adherend, and
the first adherend and the second adherend are bonded together through an expanded product of the adhesive sheet according to claim 1 in the cavity.

14. An article comprising:
a first adherend;
a third adherend;
a fourth adherend; and
a cavity between the third adherend and the fourth adherend,
wherein
the first adherend is disposed in the cavity, and
the first adherend and the third adherend and the first adherend and the fourth adherend are each bonded together through an expanded product of the adhesive sheet according to claim 1 in the cavity.

15. A method for producing an article, the method comprising:
a step 1A of bonding the first principal face of the adhesive sheet according to claim 1 to a surface of a first adherend or a surface of a cavity formed in a second adherend;
a step 2A of inserting the first adherend into the cavity; and
a step 3A of heating the adhesive sheet to expand and cure the thermally expandable thermosetting adhesive layer and to bond the first adherend and the second adherend together through an expanded product of the adhesive sheet.

16. A method for producing an article, the method comprising:
a step 1B of bonding the first principal face of the adhesive sheet according to claim 1 to a surface of a first adherend or a surface of a cavity formed by a third adherend and a fourth adherend;
a step 2B of inserting the first adherend into the cavity; and
a step 3B of heating the adhesive sheet to expand and cure the thermally expandable thermosetting adhesive layer and to bond the first adherend, and the third adherend and the fourth adherend together through an expanded product of the adhesive sheet.

* * * * *